US011908233B2

(12) United States Patent
Nagano et al.

(10) Patent No.: US 11,908,233 B2
(45) Date of Patent: Feb. 20, 2024

(54) NORMALIZATION OF FACIAL IMAGES USING DEEP NEURAL NETWORKS

(71) Applicant: Pinscreen, Inc., Los Angeles, CA (US)

(72) Inventors: Koki Nagano, Los Angeles, CA (US); Huiwen Luo, Los Angeles, CA (US); Zejian Wang, Los Angeles, CA (US); Jaewoo Seo, Los Angeles, CA (US); Liwen Hu, Los Angeles, CA (US); Lingyu Wei, Los Angeles, CA (US); Hao Li, Los Angeles, CA (US)

(73) Assignee: Pinscreen, Inc., Los Angeles, CA (US)

(*) Notice: Subject to any disclaimer, the term of this patent is extended or adjusted under 35 U.S.C. 154(b) by 290 days.

(21) Appl. No.: 17/343,575

(22) Filed: Jun. 9, 2021

(65) Prior Publication Data

US 2022/0138455 A1 May 5, 2022

Related U.S. Application Data

(60) Provisional application No. 63/108,772, filed on Nov. 2, 2020.

(51) Int. Cl.
*G06V 40/16* (2022.01)
*G06T 5/00* (2006.01)

(52) U.S. Cl.
CPC .......... *G06V 40/161* (2022.01); *G06T 5/006* (2013.01); *G06T 2207/20081* (2013.01); *G06T 2207/30201* (2013.01)

(58) Field of Classification Search
CPC .. G06V 40/161; G06V 10/764; G06V 40/169; G06T 5/006; G06T 2207/20081;
(Continued)

(56) References Cited

U.S. PATENT DOCUMENTS 6,504,546 B1 1/2003 Cosatto
6,766,299 B1 7/2004 Bellomo
(Continued)

FOREIGN PATENT DOCUMENTS

WO  WO-2021096503 A1 * 5/2021 ........... G06T 3/0081

OTHER PUBLICATIONS

Y. Zhao et al., "Learning Perspective Undistortion of Portraits," 2019 IEEE/CVF International Conference on Computer Vision (ICCV), Seoul, Korea (South), 2019, pp. 7848-7858, doi: 10.1109/ICCV.2019.00794 (Year: 2019).*

(Continued)

*Primary Examiner* — Chan S Park
*Assistant Examiner* — Daniel C Chang
(74) *Attorney, Agent, or Firm* — SoCal IP Law Group LLP; Jonathan Pearce

(57) ABSTRACT

A system, method, and apparatus for generating a normalization of a single two-dimensional image of an unconstrained human face. The system receives the single two-dimensional image of the unconstrained human face, generates an undistorted face based on the unconstrained human face by removing perspective distortion from the unconstrained human face via a perspective undistortion network, generates an evenly lit face based on the undistorted face by normalizing lighting of the undistorted face via a lighting translation network, and generates a frontalized and neutralized expression face based on the evenly lit face via an expression neutralization network.

17 Claims, 25 Drawing Sheets
(20 of 25 Drawing Sheet(s) Filed in Color)

(58) Field of Classification Search
CPC . G06T 2207/30201; G06T 2207/10024; G06T 2207/20084; G06T 2207/30196; G06T 5/008

See application file for complete search history.

(56) References Cited

U.S. PATENT DOCUMENTS

| | | | |
|---|---|---|---|
| 6,773,714 | B2 | 8/2004 | Dunn |
| 6,873,714 | B2 | 3/2005 | Witt |
| 6,876,754 | B1 | 4/2005 | Kellner |
| 6,879,709 | B2 | 4/2005 | Tian |
| 6,965,684 | B2 | 11/2005 | Chen |
| 7,103,218 | B2 | 9/2006 | Chen |
| 7,940,956 | B2 | 5/2011 | Kinoshita |
| 8,553,037 | B2 | 10/2013 | Smith |
| 8,655,030 | B2 | 2/2014 | Li |
| 8,965,762 | B2 | 2/2015 | Song |
| 9,092,663 | B2 | 7/2015 | Kono |
| 9,129,148 | B1 | 9/2015 | Li |
| 9,430,817 | B2 | 8/2016 | Schelten |
| 9,613,450 | B2 | 4/2017 | Wang |
| 9,652,890 | B2 | 5/2017 | Beeler |
| 10,504,268 | B1 | 12/2019 | Huang |
| 2004/0095344 | A1 | 5/2004 | Dojyun |
| 2004/0120554 | A1 | 6/2004 | Lin |
| 2005/0057570 | A1 | 3/2005 | Cosatto |
| 2011/0081089 | A1 | 4/2011 | Mori |
| 2011/0131041 | A1 | 6/2011 | Cortez |
| 2012/0280974 | A1 | 11/2012 | Wang |
| 2015/0084950 | A1 | 3/2015 | Li |
| 2015/0178554 | A1* | 6/2015 | Kanaujia ............... G06T 19/20 382/118 |
| 2015/0310263 | A1 | 10/2015 | Zhang |
| 2015/0317511 | A1 | 11/2015 | Li |
| 2016/0110922 | A1 | 4/2016 | Haring |
| 2016/0328630 | A1 | 11/2016 | Han |
| 2016/0360970 | A1 | 12/2016 | Tzvieli |
| 2017/0083752 | A1 | 3/2017 | Saberian |
| 2018/0025506 | A1 | 1/2018 | Li |
| 2018/0033189 | A1 | 2/2018 | Ma |
| 2018/0075581 | A1 | 3/2018 | Shi |
| 2018/0137388 | A1 | 5/2018 | Kim |
| 2018/0158240 | A1 | 6/2018 | Saito |
| 2022/0027659 | A1* | 1/2022 | LeGendre ............ G06T 15/506 |

OTHER PUBLICATIONS

Y. Adini, Y. Moses, and S. Ullman. 1997. Face recognition: the problem of compensating for changes in illumination lirection. IEEE Transactions on Pattern Analysis and Machine Intelligence 19, 7 (Jul. 1997), 721-732.

Hadar Averbuch-Elor, Daniel Cohen-Or, Johannes Kopf, and Michael F. Cohen. 2017. Bringing Portraits to Life. ACM Trans. Graph. 36, 4 (2017), to appear.

Jonathan T. Barron. 2015. Convolutional Color Constancy. In IEEE ICCV (ICCV '15). IEEE Computer Society, Washington, DC, USA, 379-387. http://dx.doi.org/10.1109/ ICCV.2015.51.

Anil Bas and William A. P. Smith. 2018. Statistical transformer networks: learning shape and appearance models via self supervision. CoRR abs/1804.02541 (2018). arXiv:1804.02541 http://arxiv.org/abs/1804.02541.

Volker Blanz and Thomas Vetter. 1999. A Morphable Model for the Synthesis of 3D Faces. In Proceedings of the 26th Annual Conference on Computer Graphics and Interactive Techniques (SIGGRAPH '99). 187-194.

Xavier P. Burgos-Artizzu, Matteo Ruggero Ronchi, and Pietro Perona. 2014. Distance Estimation of an Unknown Person from a Portrait. In ECCV. Springer International Publishing, Cham, 313-327.

Chen Cao, Yanlin Weng, Shun Zhou, Yiying Tong, and Kun Zhou. 2014. Facewarehouse: A 3d facial expression database for visual computing. IEEE TVCG 20, 3 (2014), 413-425.

Yunjey Choi, Minje Choi, Munyoung Kim, Jung-Woo Ha, Sunghun Kim, and Jaegul Choo. 2018. StarGAN: Unified Generative Adversarial Networks for Multi-Domain Image-to-Image Translation. In IEEE CVPR.

Forrester Cole, David Belanger, Dilip Krishnan, Aaron Sarna, Inbar Mosseri, and William T. Freeman. 2017. Synthesizing Normalized Faces From Facial Identity Features. In IEEE CVPR.

R. L. Cook and K. E. Torrance. 1982. A Reflectance Model for Computer Graphics. ACM Trans. Graph. 1, 1 (Jan. 1982), 7-24.

Shichuan Du, Yong Tao, and Aleix M Martinez. 2014. Compound facial expressions of emotion. Proceedings of the National Academy of Sciences 111, 15 (2014), E1454-E1462.

Arturo Flores, Eric Christiansen, David Kriegman, and Serge Belongie. 2013. Cam-era Distance from Face Images. In Advances in Visual Computing. Springer Berlin Heidelberg, Berlin, Heidelberg, 513-522.

Ohad Fried, Eli Shechtman, Dan B Goldman, and Adam Finkelstein. 2016. Perspective-aware Manipulation of Portrait Photos. ACM Trans. Graph. (Jul. 2016).

Jiahao Geng, Tianjia Shao, Youyi Zheng, Yanlin Weng, and Kun Zhou. 2018. Warp-guided GANs for Single-photo Facial Animation. ACM Trans. Graph. 37, 6, Article 231 (Dec. 2018), 12 pages.

Kyle Genova, Forrester Cole, Aaron Maschinot, Aaron Sarna, Daniel Vlasic, and William T. Freeman. 2018. Unsupervised Training for 3D Morphable Model Regres-sion. In IEEE CVPR.

A. S. Georghiades, P. N. Belhumeur, and D. J. Kriegman. 2001. From few to many: illumination cone models for face recognition under variable lighting and pose. IEEE Transactions on Pattern Analysis and Machine Intelligence 23,6 (Jun. 2001), 643-660.

Abhijeet Ghosh, Graham Fyffe, Borom Tunwattanapong, Jay Busch, Xueming Yu, and Paul Debevec. 2011. Multiview Face Capture Using Polarized Spherical Gradient Illumination. ACM Trans. Graph. 30, 6, Article 129 (2011), 10 pages.

R. Gross, I. Matthews, J. Cohn, T. Kanade, and S. Baker. 2008. Multi-PIE. In 2008 8th IEEE International Conference on Automatic Face Gesture Recognition. 1-8.

Tal Hassner, Shai Hard, Eran Paz, and Roee Enbar. 2015. Effective Face Frontalization in Unconstrained Images. In IEEE CVPR.

Liwen Hu, Shunsuke Saito, Lingyu Wei, Koki Nagano, Jaewoo Seo, Jens Fursund, Iman Sadeghi, Carrie Sun, Yen-Chun Chen, and Hao Li. 2017a. Avatar Digitization From a Single Image for Real-Time Rendering. ACM Trans. Graph. 36, 6 (2017).

Y. Hu, B. Wang, and S. Lin. 2017b. FC4 : Fully Convolutional Color Constancy with Confidence-Weighted Pooling. In IEEE CVPR. 330-339.

Yibo Hu, Xiang Wu, Bing Yu, Ran He, and Zhenan Sun. 2018a. Pose-Guided Photoreal-istic Face Rotation. In IEEE CVPR.

ItSeez3D: Avatar SDK 2019. https://avatarsdk.com. Accessed 2019.

Rui Huang, Shu Zhang, Tianyu Li, and Ran He. 2017. Beyond Face Rotation: Global and Local Perception GAN for Photorealistic and Identity Preserving Frontal View Synthesis. In IEEE ICCV.

P. Isola, J. Zhu, T. Zhou, and A. A. Efros. 2017. Image-to-Image Translation with Conditional Adversarial Networks. In IEEE CVPR. 5967-5976.

Justin Johnson, Alexandre Alahi, and Fei-Fei Li. 2016. Perceptual Losses for Real-Time Style Transfer and Super-Resolution. CoRR abs/1603_08155 (2016). http: //arxiv.org/abs/1603.08155.

Tero Karras, Samuli Laine, and Timo Aila. 2018. A Style-Based Generator Architecture for Generative Adversarial Networks. CoRR abs/1812_04948 (2018). http://arxiv.org/ abs/1812.04948.

Vahid Kazemi and Josephine Sullivan. 2014. One millisecond face alignment with an ensemble of regression trees. In IEEE CVPR. 1867-1874.

Hyeongwoo Kim, Pablo Carrido, Ayush Tewari, Weipeng Xu, Justus Thies, Matthias Niessner, Patrick Perez, Christian Richardt, Michael Zollhofer, and Christian Theobalt. 2018. Deep Video Portraits. ACM Trans. Graph. 37, 4, Article 163 (Jul. 2018), 14 pages.

Oliver Langner, Ron Dotsch, Gijsbert Bijlstra, Daniel HJ Wigboldus, Skyler T Hawk, and AD Van Knippenberg. 2010. Presentation and validation of the Radboud Faces Database. Cognition and emotion 24, 8 (2010), 1377-1388.

Chen Li, Kun Zhou, and Stephen Lin. 2014. Intrinsic Face Image Decomposition with Human Face Priors. In ECCV. 218-233.

(56) References Cited

OTHER PUBLICATIONS

Ce Liu, Heung-Yeung Shum, and Chang-Shui Zhang. 2001. A two-step approach to hallucinating faces: global parametric model and local nonparametric model. In IEEE CVPR, vol. 1. I-I.

Loom.ai, http://www.loom.ai—Date accessed 2019.

Debbie S Ma, Joshua Correll, and Bernd Wittenbrink. 2015. The Chicago face database: A free stimulus set of faces and norming data. Behavior research methods 47, 4 (2015), 1122-1135.

Koki Nagano, Jaewoo Seo, Jun Xing, Lingyu Wei, Zimo Li, Shunsuke Saito, Aviral Agarwal, Jens Fursund, and Hao Li. 2018. paGAN: Real-time Avatars Using Dynamic Textures. ACM Trans. Graph. 37, 6, Article 258 (Dec. 2018), 12 pages.

Patrick Pérez, Michel Gangnet, and Andrew Blake. 2003. Poisson Image Editing. ACM Trans. Graph. 22, 3 (Jul. 2003), 313-318.

Pinscreen. 2019. http://www.pinscreen.com. Accessed 2019.

Ravi Ramamoorthi and Pat Hanrahan. 2001. An efficient representation for irradiance environment maps. In Proceedings of the 28th annual conference on Computer graphics and interactive techniques. ACM, 497-500.

Shunsuke Saito, Lingyu Wei, Liwen Hu, Koki Nagano, and Hao Li. 2017. Photorealistic Facial Texture Inference Using Deep Neural Networks. In IEEE CVPR.

Florian Schroff, Dmitry Kalenichenko, and James Philbin. 2015. FaceNet: A Unified Embedding for Face Recognition and Clustering. In IEEE CVPR.

Soumyadip Sengupta, Angjoo Kanazawa, Carlos D. Castillo, and David W. Jacobs. 2018. SfSNet: Learning Shape, Refectance and Illuminance of Faces in the Wild. In IEEE CVPR.

Amnon Shashua and Tammy Riklin-Raviv. 2001. The Quotient Image: Class-Based Re-Rendering and Recognition with Varying Illuminations. IEEE Trans. Pattern Anal. Mach. Intell. 23, 2 (Feb. 2001), 129-139.

YiChang Shih, Wei-Sheng Lai, and Liang Chia-Kai. 2019. Distortion-Free Wide-Angle Portraits on Camera Phone& ACM Trans. Graph. 38, 4 (2019).

YiChang Shih, Sylvain Paris, Connelly Barnes, William T. Freeman, and Frédo Durand. 2014. Style Transfer for Headshot Portraits. ACM Trans. Graph. 33, 4, Article 148 (Jul. 2014), 14 pages.

Zhixin Shu, Sunil Hadap, Eli Shechtman, Kalyan Sunkavalli, Sylvain Paris, and Dimitris Samaras. 2017. Portrait Lighting Transfer Using a Mass Transport Approach. ACM Trans. Graph. 36, 4, Article 145a (Oct. 2017).

K. Simonyan and A. Zisserman. 2014. Very Deep Convolutional Networks for Large-Scale Image Recognition. CoRR abs/1409. 1556 (2014).

Lingxiao Song, Zhihe Lu, Ran He, Zhenan Sun, and Tieniu Tan. 2017. Geometry Guided Adversarial Facial Expression Synthesis. arXiv preprint arXiv:1712.03474 (2017).

Tiancheng Sun, Jonathan Barron, Yun-Ta Tsai, Zexiang Xu, Xueming Yu, Graham Fyffe, Christoph Rhemann, Jay Busch, Paul Debevec, and Ravi Ramamoorthi. 2019. Single Image Portrait Relighting. ACM Trans. Graph. 38, 4 (2019).

Christian Szegedy, Sergey Ioffe, and Vincent Vanhoucke. 2016. Inception-v4, Inception—ResNet and the Impact of Residual Connections on Learning. In ICLR Workshop.

Justus Thies, Michael Zollhofer, Marc Stamminger, Christian Theobalt, and Matthias Nießner. 2016. Face2face: Real-time face capture and reenactment of rgb videos. In IEEE CVPR. 2387-2395.

Ting-Chun Wang, Ming-Yu Liu, Jun-Yan Zhu, Andrew Tao, Jan Kautz, and Bryan Catanzaro. 2018. High-Resolution Image Synthesis and Semantic Manipulation with Conditional GANs. In IEEE CVPR.

Y. Wang, L. Zhang, Z. Liu, G. Hua, Z. Wen, Z. Zhang, and D. Samaras. 2009. Face Relighting from a Single Image under Arbitrary Unknown Lighting Conditions. IEEE Transactions on Pattern Analysis and Machine Intelligence 31, 11 (Nov. 2009), 1968-1984.

Brittany Ward, Max Ward, Ohad Fried, and Boris Paskhover. 2018. Nasal distortion in short-distance photographs: The selfie effect. JAMA Facial Plastic Surgery 20, 4 (2018), 333-335. arXiv:/data/journals/faci/937383/jamafacialw ard2018ld180002.pdf.

Shih-En Wei, Varun Ramakrishna, Takeo Kanade, and Yaser Sheikh. 2016. Convolutional pose machines. In IEEE CVPR.

Chenglei Wu, Takaaki Shiratori, and Yaser Sheikh. 2018b. Deep Incremental Learning for Efficient High-fidelity Face Tracking. ACM Trans. Graph. 37, 6, Article 234 (Dec. 2018), 12 pages.

Xiang Wu, Ran He, Zhenan Sun, and Tieniu Tan. 2018a. A light CNN for deep face representation with noisy labels. IEEE Transactions on Information Forensics and Security 13, 11 (2018), 2884-2896.

Xiangyu Zhu, Z. Lei, Junjie Yan, D. Yi, and S. Z. Li. 2015. High-fidelity Pose and Expression Normalization for face recognition in the wild. In 2015 IEEE Conference on Computer Vision and Pattern Recognition (CVPR). 787-796. https://doi.org/10. 1109/CVPR.2015.7298679.

Shuco Yamaguchi, Shunsuke Saito, Koki Nagano, Yajie Zhao, Weikai Chen, Kyle Ol-szewski, Shigeo Morishima, and Hao Li. 2018. High-fidelity Facial Reflectance and Geometry Inference from an Unconstrained Image. ACM Trans. Graph. 37, 4, Article 162 (Jul. 2018), 14 pages.

Yajie Zhao, Zeng Huang, Tianye Li, Weikai Chen, Chloe LeGendre, Xinglei Ren, Jun Xing, Ari Shapiro, and Hao Li. 2019. Learning Perspective Undistortion of Portraits. arXiv preprint arXiv:1905. 07515 (2019).

Andrey Zhmoginov and Mark Sandler. 2016. Inverting Face Embeddings with Convolu-tional Neural Networks. https://arxiv.org/abs/1606.04189.

Queiroz, Rossana B., Adriana Braun, and Soraia Raupp Musse. "A framework for generic facial expression transfer." Entertainment Computing 18 (2017): 125-141. (Year: 2017).

Thomas, Diego, and Rin-Ichiro Taniguchi. "Augmented blendshapes for real-time simultaneous 3d head modeling and facial motion capture." Proceedings of the IEEE Conference on Computer Vision and Pattern Recognition. 2016. (Year: 2016).

Cole, Forrester, et al. "Synthesizing normalized faces from facial identity features." Proceedings of the IEEE conference on computer vision and pattern recognition. 2017. (Year: 2017).

Olszewski, Kyle, et al. "Realistic dynamic facial textures from a single image using gans." Proceedings of the IEEE International Conference on Computer Vision. 2017. (Year: 2017).

Zhou, Yuqian, and Bertram Emil Shi. "Photorealistic facial expression synthesis by the conditional difference adversarial autoencoder." 2017 seventh international conference on affective computing and intelligent interaction (ACII). IEEE, 2017. (Year: 2017).

Huang, Yuchi, and Saad M. Khan. "Dyadgan: Generating facial expressions in dyadic interactions." Proceedings of the IEEE Conference on Computer Vision and Pattern Recognition Workshops. 2017. (Year: 2017).

The International Bureau of WIPO, International Preliminary Report on Patentability for PCT Application No. PCT/US2017/064239, dated Jun. 4, 2019.

Saito, Shunsuke, Tianye Li, and Hao Li. "Real-time facial segmentation and performance capture from rgb input." European Conference on Computer Vision. Springer, Cham, 2016. (Year: 2016).

Ghiasi, Golnaz. Recognizing and Segmenting Objects in the Presence of Occlusion and Clutter. Diss. UC Irvine, 2016. (Year: 2016).

Gauthier, Jon. "Conditional generative adversarial nets for convolutional face generation." Class Project for Stanford CS231 N: Convolutional Neural Networks for Visual Recognition, Winter semester May 2014 (2014): 2. (Year: 2014).

Denton, Emily L., Soumith Chintala, and Rob Fergus. "Deep generative image models using appalaplacian pyramid of adversarial networks." Advances in neural information processing systems. 2015. (Year: 2015).

Hsieh, Pei-Lun, et al. "Unconstrained realtime facial performance capture." Proceedings of the IEEE Conference on Computer Vision and Pattern Recognition. 2015. (Year: 2015).

Long, Jonathan, Evan Shelhamer, and Trevor Darrell. "Fully convolutional networks for semantic segmentation." Proceedings of the IEEE conference on computer vision and pattern recognition. 2015. (Year: 2015).

(56) References Cited

OTHER PUBLICATIONS

Noh, Hyeonwoo, Seunghoon Hong, and Bohyung Han. "Learning deconvolution network for semantic segmentation." Proceedings of the IEEE international conference on computer vision. 2015. (Year: 2015).

Weise, Thibaut, et al. "Realtime performance-based facial animation." ACM transactions on graphics (TOG). vol. 30. No. 4. ACM, 2011. (Year: 2011).

Luc, Pauline, et al. "Semantic segmentation using adversarial networks." arXiv preprint arXiv: 1611.08408 (2016). (Year: 2016).

* cited by examiner

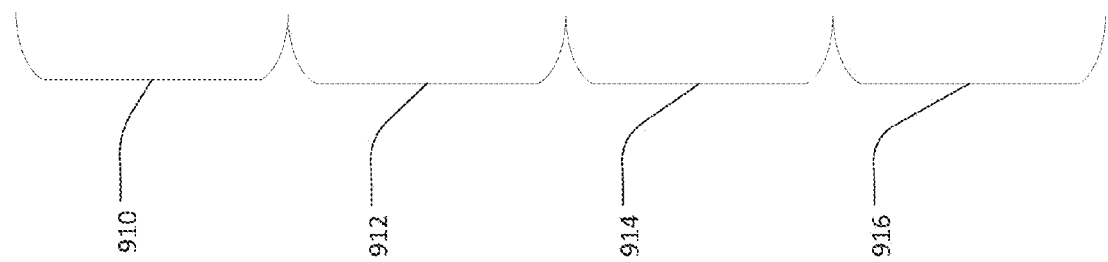
FIG. 9

NORMALIZATION OF FACIAL IMAGES USING DEEP NEURAL NETWORKS

RELATED APPLICATION INFORMATION

This patent claims priority from U.S. provisional patent application No. 63/108,772 entitled "Deep Face Normalization" filed Nov. 2, 2020.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the generating of a normalization of a two-dimensional (2D) image of an unconstrained human face.

Description of the Related Art

All kinds of facial expressions can be seen in selfies, portraits, and Internet pictures. These photos are taken from various camera types, and under a vast range of angles and lighting conditions. A picture of a person's frontal face with blank expressions, captured in an evenly lit environment, and free from perspective distortion, is not only ideal for facial recognition, but also extremely useful for a wide range of graphics applications, ranging from portrait manipulation to image-based three-dimensional (3D) avatar digitization. While billions of portraits and selfies are shared over the Internet, people tend to smile and express their emotions in front of the camera. Pictures are mostly taken under a vast range of challenging lighting conditions, and selfies generally cause noticeable facial distortions such as enlarged noses. In the context of counter-terrorism and law enforcement, images of suspects are often limited and highly deteriorated.

Various solutions for image-based relighting and facial alterations exist, but they typically require accurate prior knowledge about the person's face or any available scene parameters. These algorithms work best if the faces are neutral and captured under well-conditioned scene illuminations. Advanced camera effects for facial expression manipulation are also difficult to apply on these unconstrained photos, since a neutral expression is often needed that is free from deformations. Furthermore, the ability to perform proper relighting on images with harsh illuminations is nearly impossible. When images with very different focal settings are used, three-dimensional avatar creation apps tend to produce different looking characters. Many prior art methods have focused on an opposite problem, posing facial models in a convincing manner to reflect facial expressions when the models are based upon a neutral initial model.

While end-to-end face normalization systems exist, they can only produce low resolution images, which are not suitable for high-fidelity image-based three-dimensional avatar creation or high-resolution portrait manipulation. Furthermore, individual normalization tasks for distortion, lighting, pose, and expressions are not possible.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 is a set of examples showing a comparison of images of faces with variants of geometry neutralization.

Figure 1:
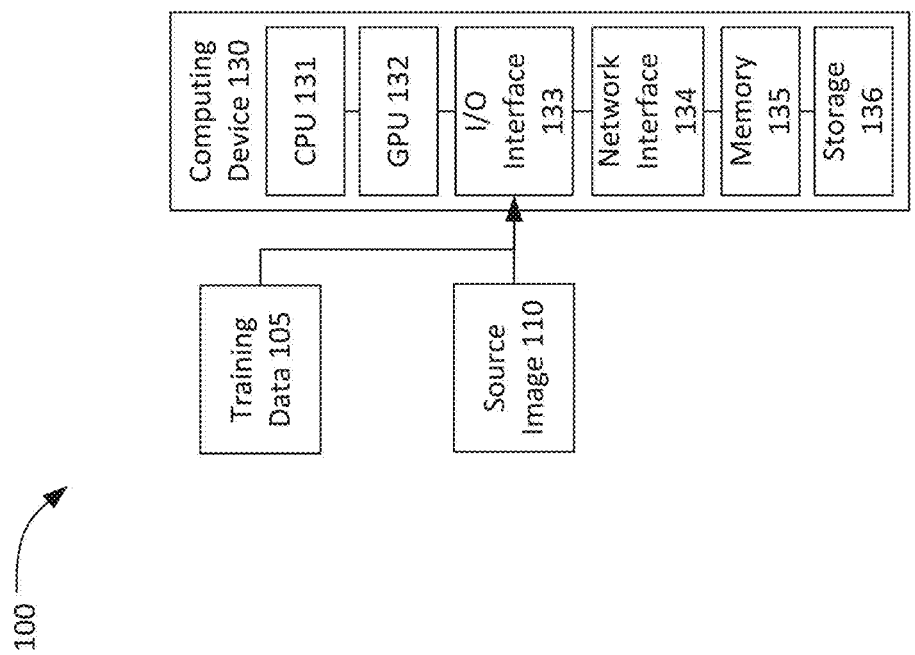
FIG. 1 is a structural diagram of a system for generating a normalization of a two-dimensional (2D) image of an unconstrained human face.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The systems and methods herein use a deep learning framework that can fully normalize unconstrained face images, i.e., remove perspective distortions caused by camera distance, relight to an evenly lit environment, and predict a frontal and neutral face, similar to a passport-like photo. A high-resolution image can be produced while preserving important facial details and the likeness of the subject, along with the original background. Three consecutive normalization steps are performed, each using a different generative adversarial network (GAN) that acts as an image generator. Perspective distortion removal is performed via a perspective undistortion network using a dense flow field predictor. A uniformly illuminated face is obtained via a lighting translation network, and the facial expression is neutralized via an expression neutralization network using a generalized facial expression synthesis framework combined with a regression network based on deep features for facial recognition. Key applications of this method range from robust image-based three-dimensional avatar creation, portrait manipulation, to facial enhancement and reconstruction tasks for crime investigation.

Lens distortion control, relighting, and facial expression manipulation have been extensively investigated as separate problems in the graphics and vision community. Even if accurate scene and face parameters are recoverable, the ability to synthesize a plausible and photorealistic output is still challenging due to the complexity of facial deformations and appearance changes under intricate scene captures. Furthermore, the combination of these problems increases the difficulty of a proper disentanglement. For instance, a harsh lighting condition or perspective-distorted face can significantly deteriorate the ability to restore its neutral face from one with a smile.

Facial shots from various distances can cause distortive effects on the face and have a significant impact on the perceived nasal size. Though methods for estimating the camera-subject distance from a face photograph have been introduced, as well as algorithms for manipulating those as a post-effect, the present method is instead concerned with directly removing the perspective distortion in the input image using a deep neural network. This method does not rely on fitting a three-dimensional (three-dimensional) face model and can therefore undistort an input picture without known camera distance parameters.

Relighting a face in an unconstrained image can yield visible artifacts and unpleasant shadings. Despite the recent efforts to improve the separation and estimation of shape, reflectance, and illuminations in faces, it remains difficult to render and composite these faces on existing photographs without appearing uncanny. The present method first estimates the lighting condition using spherical harmonics, then uses an illumination-conditioned GAN to synthesize a face with normalized lighting conditions.

Previous attempts at frontalizing and neutralizing faces from images have required a successful initial face fitting, but still could not ensure a plausible or consistent neutral face to be generated from a range of expressions and accurate details. Using the present method, frontalizing a face on a portrait can be achieved via a GAN-based approach, while conditioning a generator to a dense three-dimensional face geometry that allows preservation of high-resolution details.

From an unconstrained picture, this method sequentially removes perspective distortion, re-illuminates the scene with an evenly lit diffuse illumination with proper exposure, and neutralizes the person's expression. For mild head rotations, the method can successfully infer a frontal face with its nearby body and hair deformations.

Description of Apparatus

FIG. 1 is a structural diagram of a system 100 for generating neutralized images from a single input image. The system 100 includes training data 105, an image source 110, and a computing device 130. The image source 110 may be storage (e.g., storage 136) on the computing device 130 itself or may be external. The various components may be interconnected by a network.

The training data 105 is preferably a set of two-dimensional (2D) images of faces. The training data 105 includes data for training a perspective undistortion network, a lighting translation network, and an expression neutralization network. The training data for the perspective undistortion network includes images of faces with known focal length and camera-subject distance. The training data for the lighting translation network includes images with images of faces captured under uniformly lit white illumination and images with data augmentation. The training data for the expression neutralization network includes pairs of input facial recognition features and ground truth three-dimensional geometry with known camera and subject distances and neutral-to-expression and expression-to-neutral datasets. The training data 105 enables the generative portion of the GANs to "learn" about perspective distortion, even illumination, and expression neutralization from corresponding two-dimensional images to create possible options. It also allows the discriminator portion of the generative adversarial network to work with the generative portion to "knock out" or exclude faces that are inadequate or otherwise do not make the grade. If the training is good, over time, the GANs becomes better at respectively removing perspective distortion, evening lighting, and frontalizing pose and neutralizing expressions, and the discriminator becomes more "fooled" by the real or fake determination for the resulting face and indicates that the face is realistic.

The source image 110 may come from a still camera or a video camera capturing an unconstrained image of a face. The source image 110 may be from a short term or long-term storage device holding data that represents images. For example, the source image 110 may come from a database of images, may be the Internet, or may be any number of other sources of image data. Associated image data is not an image generated using any complex lighting or capture system, or any high-resolution depth sensors such that any actual facial data is contained within the image data itself. Instead, the image is a typical, two-dimensional image format such as PNG, JPG, BMP, and may be in almost any resolution, so long as a face is recognizable as human.

The computing device 130 includes a central processing unit (CPU) 131, a graphics processing unit (GPU) 132, an input-output (I/O) interface 133, a network interface 134, memory 135, and storage 136.

The CPU 131 may execute instructions associated with an operating system for the computing device 130 as well as instructions associated with one or more applications suitable for enabling the functions described herein. The CPU 131 may be or include one or more microprocessors, microcontrollers, digital signal processors, application specific integrated circuits (ASICs), or systems-on-a-chip (SOCs). The CPU 131 may be specialized, designed for operations upon visual, graphical, or audio data, or may be general purpose processors. Though identified as a central processing unit, the CPU 131 may be multiple processors, for example, multi-core processors or a series of processors joined by a bus to increase the overall throughput or capabilities of the CPU 131.

The GPU 132 may execute instructions suitable for enabling the functions described herein. In particular, the GPU 132 may be used in connection with particular image-related operations which the GPU 132 is uniquely suited to perform. The GPU 132 may be any of the things that the CPU 131 is. However, the GPU 132 is distinct in that it is a specialized processor that is designed for the purpose of processing visual data and performs faster memory operations and access. More recently, GPUs, like GPU 132, have also been manufactured with instruction sets designed around artificial intelligence or neural network functions. The instruction sets and memory in the GPU 132 are specifically designed for operation upon graphical data or upon training data sets (which in this case involve graphical data) and in efficiently operating as neural networks. In this way, the GPU 132 may be especially suited to operation upon the image data or to quickly and efficiently performing the complex mathematical operations described herein. Like the CPU 131, the GPU 132 is shown as a single graphics processing unit, but may be one or more graphics processing units in a so-called multi-core format, or linked by a bus or other connection that may together be applied to a single set of or to multiple processing operations.

The I/O interface 133 may include one or more general purpose wired interfaces (e.g., a universal serial bus (USB), high-definition multimedia interface (HDMI)), one or more connectors for storage devices such as hard disk drives, flash drives, or proprietary storage solutions.

The network interface 134 may include radio-frequency circuits, analog circuits, digital circuits, one or more antennas, and other hardware, firmware, and software necessary for network communications with external devices. The network interface 134 may include both wired and wireless connections. For example, the network may include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol.

The network interface 134 may include one or more specialized processors to perform functions such as coding/decoding, compression/decompression, and encryption/decryption as necessary for communicating with external devices using selected communications protocols. The network interface 134 may rely on the CPU 131 to perform some or all of these functions in whole or in part.

The memory 135 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 135 may store software programs and routines for execution by the CPU 131 or GPU 132 (or both together). These stored software programs may include operating system software. The operating system may include functions to support the I/O interface 133 or the network interface 134, such as protocol stacks, coding/decoding, compression/decompression, and encryption/decryption. The stored software programs may include an application or "app" to cause the computing device to perform portions or all of the processes and functions described herein. The words "memory" and "storage", as used herein, explicitly exclude transitory media including propagating waveforms and transitory signals.

Storage 136 may be or include non-volatile memory such as hard disk drives, flash memory devices designed for long-term storage, writable media, and other proprietary storage media, such as media designed for long-term storage of image data.

In some cases, one or more additional computing devices, like computing device 130, may be connected by the network interface 134 which may be a wired interface, such as Ethernet, universal serial bus (USB), or a wireless interface such as 802.11x, LTE, or other wireless protocol to enable the additional, computing devices to perform some or all of the operations discussed herein. For example, the CPU 131 and GPU 132 of the computing device 130 may be less powerful than that available in a connected system (e.g., a multicore process or group of multicore processors) or a group of GPUs (e.g., a single powerful GPU or a set of GPUs interconnected by SLI or CrossFire®) such that a connected computing device is better-capable of performing processor-intensive tasks such as the convolution or segmentation processes discussed more fully below. In some implementations, the one or more additional computing devices may be used to perform more processor-intensive tasks, with the tasks being offloaded via the I/O interface 133 or network interface 134. In particular, the training processes discussed herein may rely upon external computing devices.

Figure 2:
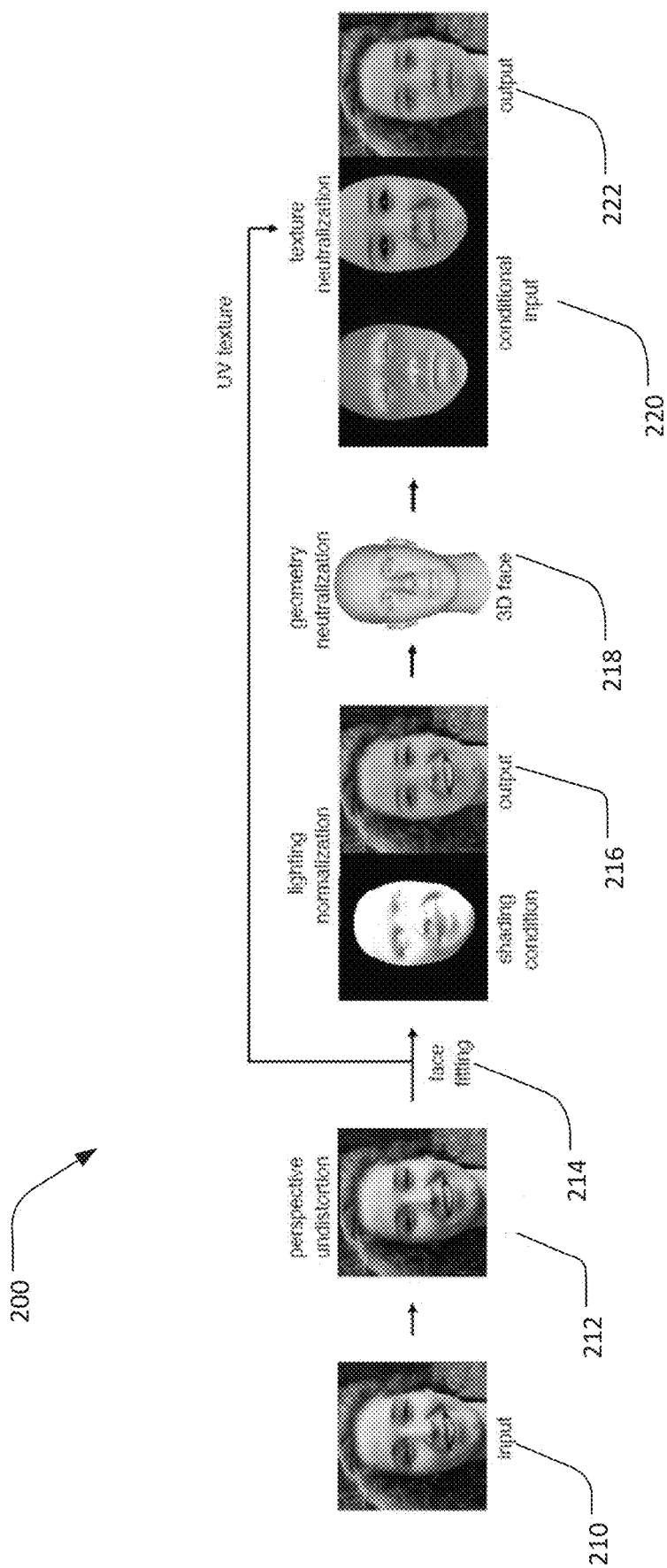
FIG. 2 is a functional diagram of a deep learning framework system used for generating a normalization of a two-dimensional image of an unconstrained human face.

FIG. 2 is a functional diagram of a deep learning framework system 200 used for generating a normalization of a two-dimensional (2D) image of an unconstrained human face, which could be implemented with the system 100 of FIG. 1 and includes the steps of perspective undistortion, lighting normalization and expression frontalization and expression neutralization. Each of these is addressed by a conditional GAN, which allows individual control of each step (e.g., expression neutralization without applying lighting normalization).

The process begins with a two-dimensional input image of an unconstrained face 210 that is perspective distorted. The image is then normalized into a near orthographic projection 212 by predicting a dense flow image based on a variant, followed by a global warp and in-painting operation. Next, a rough three-dimensional face model is fit 214 to the undistorted image, and this three-dimensional geometry is used as a proxy to extract auxiliary information such as the spherical harmonics (SH) coefficients of the lighting, rigid pose parameters, and UV texture (axes of two-dimensional texture). Using the input picture and the estimated scene illumination, a GAN conditioned on the SH coefficients is used to synthesize a high-quality image of a face lit under even lighting such that the true skin tone is reflected 216. An offset-based lighting representation is used to preserve high-frequency details such as facial hair and skin textures. The final step consists of neutralizing geometry of the face 218 and frontalizing the face 220. The resulting output image of the face 222 is plausible and faithful to the person's identity, and a consistent neutral face can be predicted from a wide range of expressions. Previous photorealistic facial expression synthesis networks merely produce expressions from a neutral face and cannot neutralize from arbitrary expressions.

Figure 3:
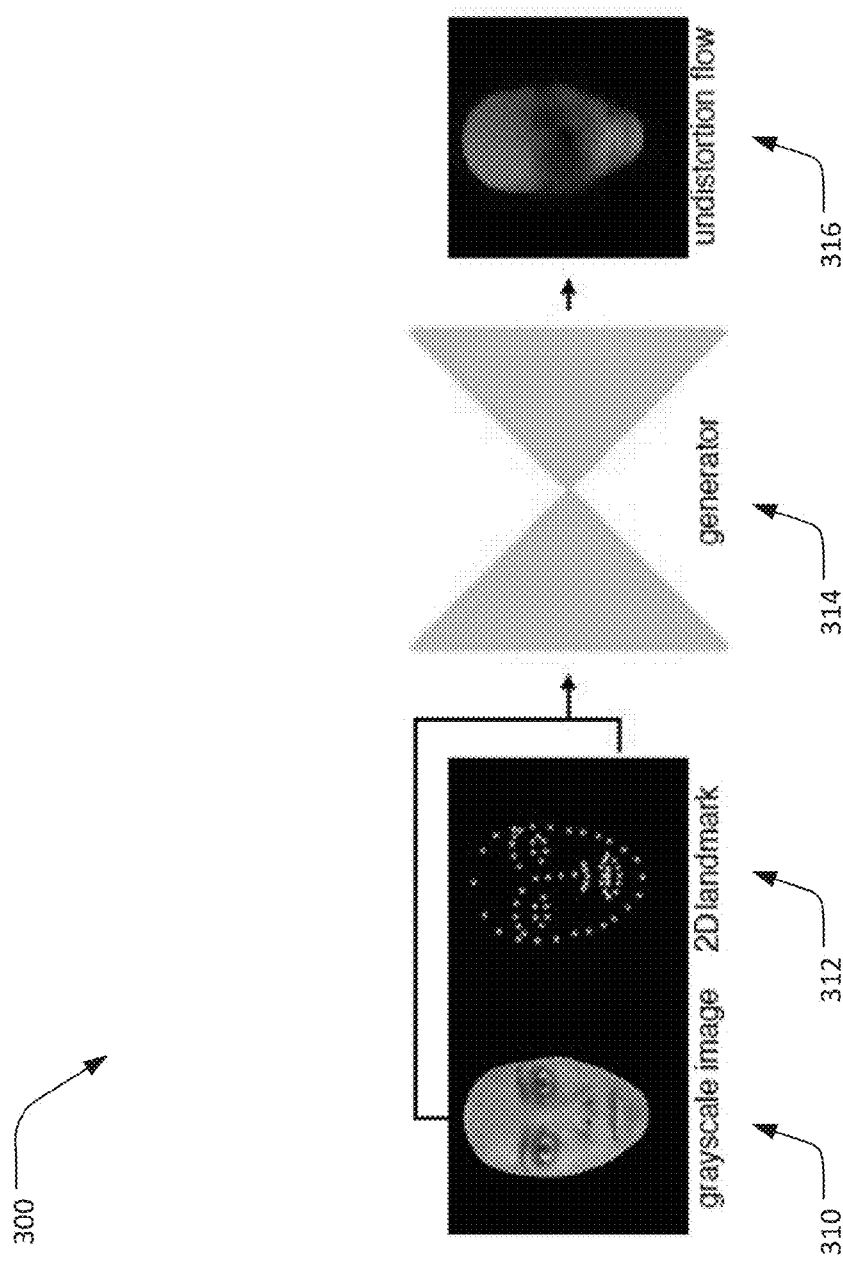
FIG. 3 is a functional diagram of a perspective undistortion network.

FIG. 3 is a functional diagram of a perspective undistortion network 300 used for removing distortion from an unconstrained two-dimensional input image of a face. The input image is converted to a grayscale image 310 and a facial mask is applied to ignore the background. Given the input image I, landmark detection is performed to obtain two-dimensional facial landmarks L 312. Given I and L, the perspective undistortion network generator $G_{flow}$ 314 predicts a dense two-dimensional flow F (undistortion flow 316) which provides a map of the movement from all points in the input image to an undistorted image, to correct the distortion:

$$F = G_{flow}(I, L)$$

To train the network, dense flow fields are created by fitting three-dimensional face models to input photographs with known focal length and camera-subject distance. Perspective distortion is simulated by rendering each subject with different camera-subject distances. The dense two-dimensional flow field is derived by rasterizing the face model, before and after the distance manipulation given three-dimensional mesh correspondence. Since the flow field is learned in two-dimensional, it is more effective if the training distance is sampled so that the two-dimensional image space appearance changes evenly. To quantify the changes of the two-dimensional warp field, a measurement is made of the mean two-dimensional landmark distance between the perspective projections at a particular distance and the orthographic projection using a mean face of a three-dimensional morphable face model.

Figure 4:
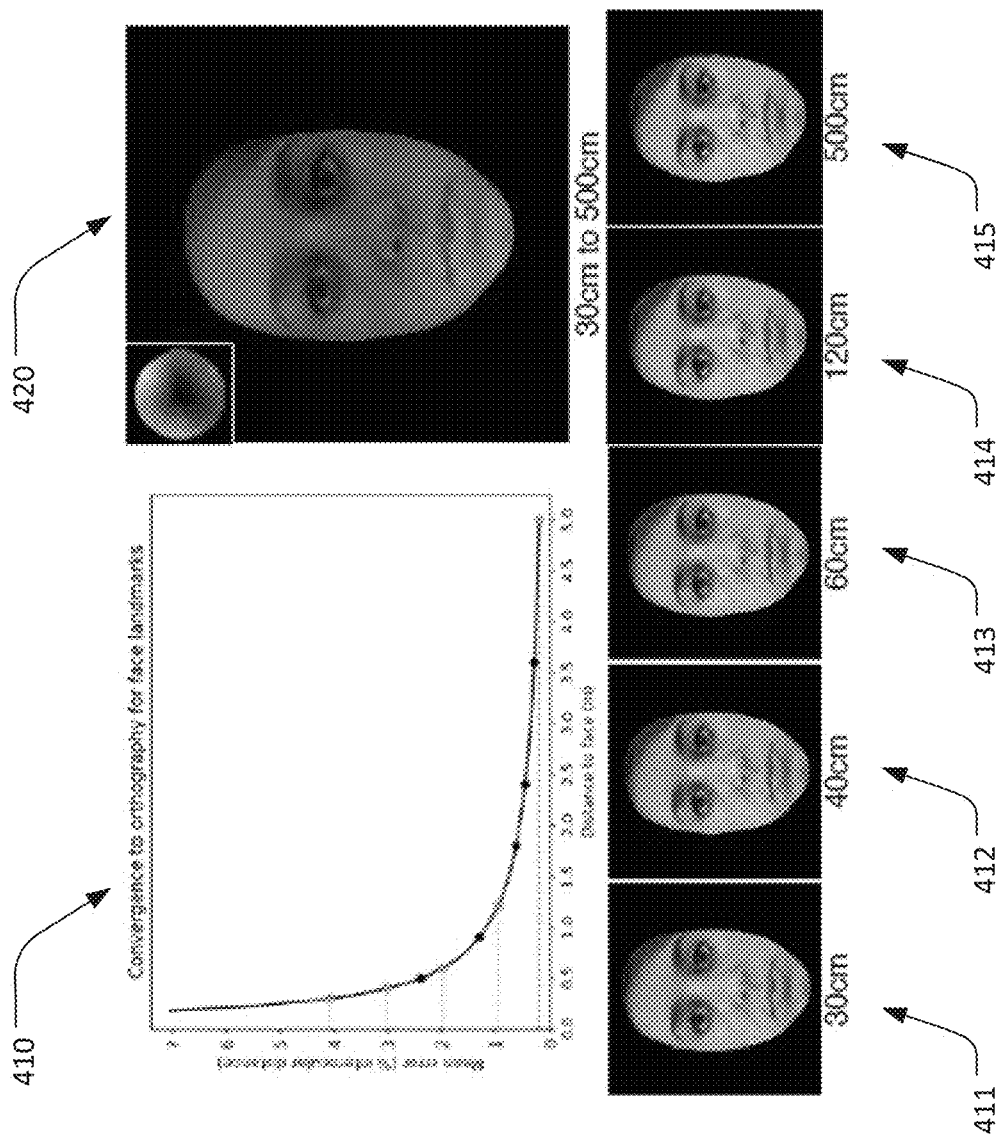
FIG. 4 is a graph showing perspective distortion for various camera-subject distances and corresponding pictures.

Perspective distortion is nonlinear to the camera-subject distance and focal length. In particular, perspective distortion changes rapidly when the distance gets closer and/or the focal length becomes shorter. For this reason, the sample rate is varied along the distance to capture more changes in closer distances (e.g., 30 cm to 1.2 m). Graph 410 of FIG. 4 shows that perspective distortion is roughly linear if the distances are sampled evenly in the vertical error scale (blue dots and the corresponding pictures 411, 412, 413, 414, and 415). 10 discrete distances (blue and black dots) are sampled for synthetic training data. This procedure generates 100K ground truth flow images for all subjects in the training data. As seen in graph 410, the perspective distortion converges nearly to an orthographic projection at 5 m, which was the reference distance to warp all the input images as if the images were captured at 5 m distance with a telephoto lens (approx. 350 mm in 35 mm camera). An example of synthetic flow (from 30 cm to 5 m) is shown in image 420.

To train the network, a weighted L2 pixel loss is performed that measures the difference between the prediction from our U-net based generator $G_{flow}$ (I, L) 314 and ground truth synthetic flow $F_{gt}$:

$$L = \langle W_i \| F_{gt} - G_{flow}(I,L) \|^2 \rangle \quad (2)$$

The squared difference per pixel using a weight map W is accumulated, which is created by rasterizing the input two-dimensional landmark image L 312 to favor increased accuracy around the two-dimensional facial features (e.g., nose, eyes, or mouth). Gaussian blurring with a kernel size K (e.g., K=31) is employed to ensure smoothness of the output flow with 10 times higher weights around facial features. To make the inference more robust against challenging input images, random brightness, contrast, and blurring are added during the training. Since the network is based on image-to-image translation, the training is more efficient if a flow that aligns with the input image pixels is estimated. A drawback of such forward warping is that a naive pixel-level mapping can cause holes in the target image. To properly warp all the pixels including the image background, flow inpainting combined with Laplacian smoothing is performed.

Once the perspective distortion is removed, three-dimensional face fitting is performed to the corrected input image, and a fitted three-dimensional mesh, SH coefficients, and UV texture are obtained for subsequent steps.

Figure 5:
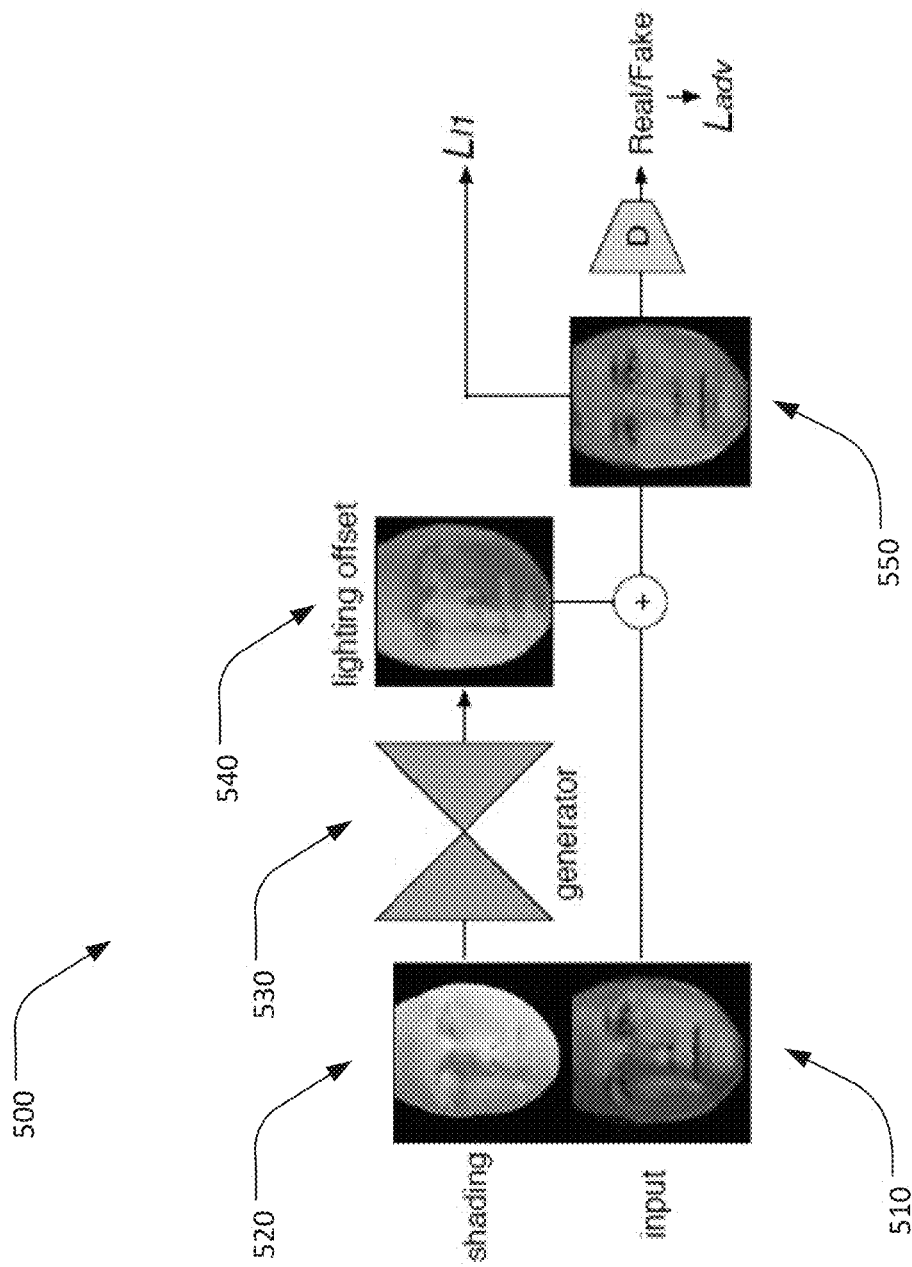
FIG. 5 is a functional diagram of a lighting translation network.
Figure 18:
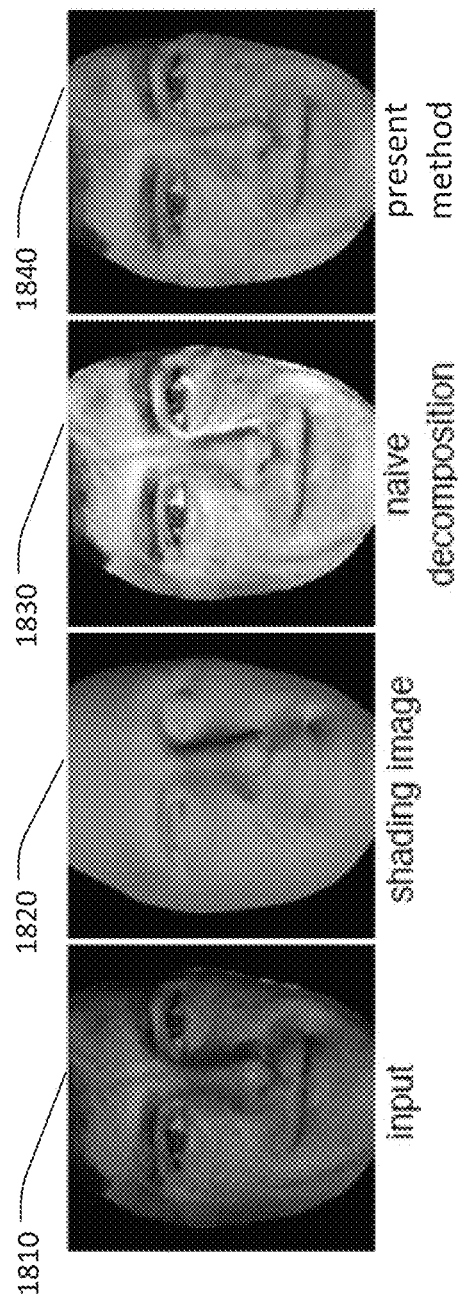
FIG. 18 shows a comparison of the system of FIG. 5 with a naive lighting decomposition system using an estimated shading image.

FIG. 5 shows a functional diagram of a lighting translation network 500 for normalizing lighting of an undistorted input 510. While SH based illumination models can represent real-world illumination effectively if the scene's reflectance is near Lambertian, the skin of human faces generally has more complex reflectance properties, such as specular reflections, subsurface scattering, cast shadows. As shown in FIG. 18, a naive shading decomposition can lead to significant artifacts. Nevertheless, this SH-based shading information 520 is sufficient in providing a coarse guide for the scene illumination when inferring an evenly lit face using a deep learning-based approach. Instead of directly using the estimated lighting condition to decouple the illumination, this task is performed using a conditional GAN for image synthesis by conditioning the inference using the estimated SH values obtained from three-dimensional face fitting.

Figure 19:
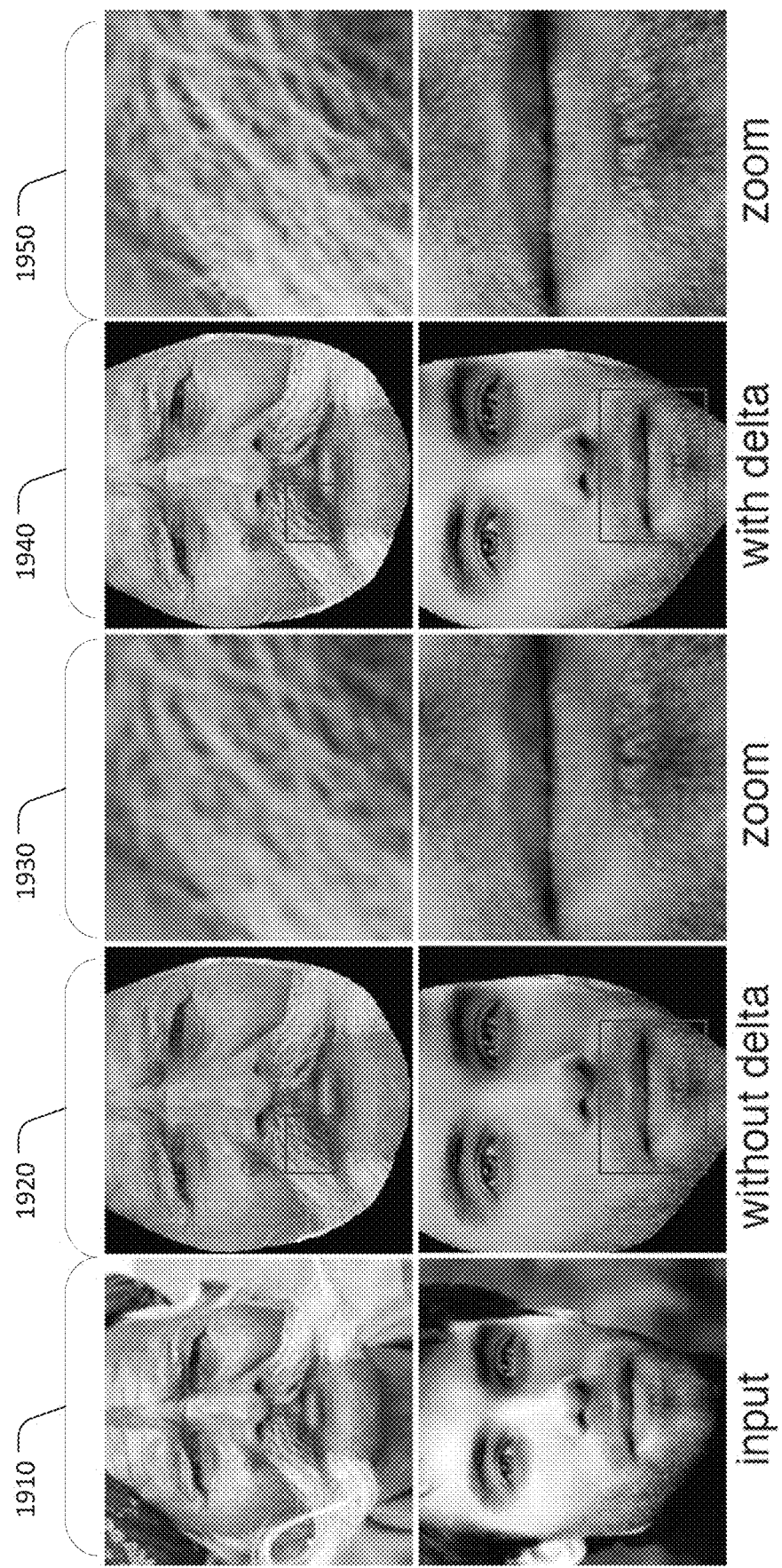
FIG. 19 shows a comparison of lighting normalization systems.

To preserve important high-frequency facial details during the inference of high-resolution images, such as (pores, facial hair, specular reflections, etc.), an offset-based image representation is introduced, instead of inferring target pixel colors directly from a generator. Hence, a lighting offset image $O_{lit}$ 540 is predicted by a generator $G_{lit}$ 530 that produces an evenly lit face, when it is added to the input image. More specifically, given a masked input image I 510 and SH shading image S 520, the illumination normalized photograph $I_l$ is produced as $$I_{lit} = O_{lit} + I$$

where $O_{lit} = G_{lit}(I, S)$. This approach can preserve significantly higher resolution details, as shown in FIG. 19. Further, this approach enables the two-dimensional input image to be corrected for shading so that a suitably lit image for use with the remainder of this process may be generated.

Figure 6:
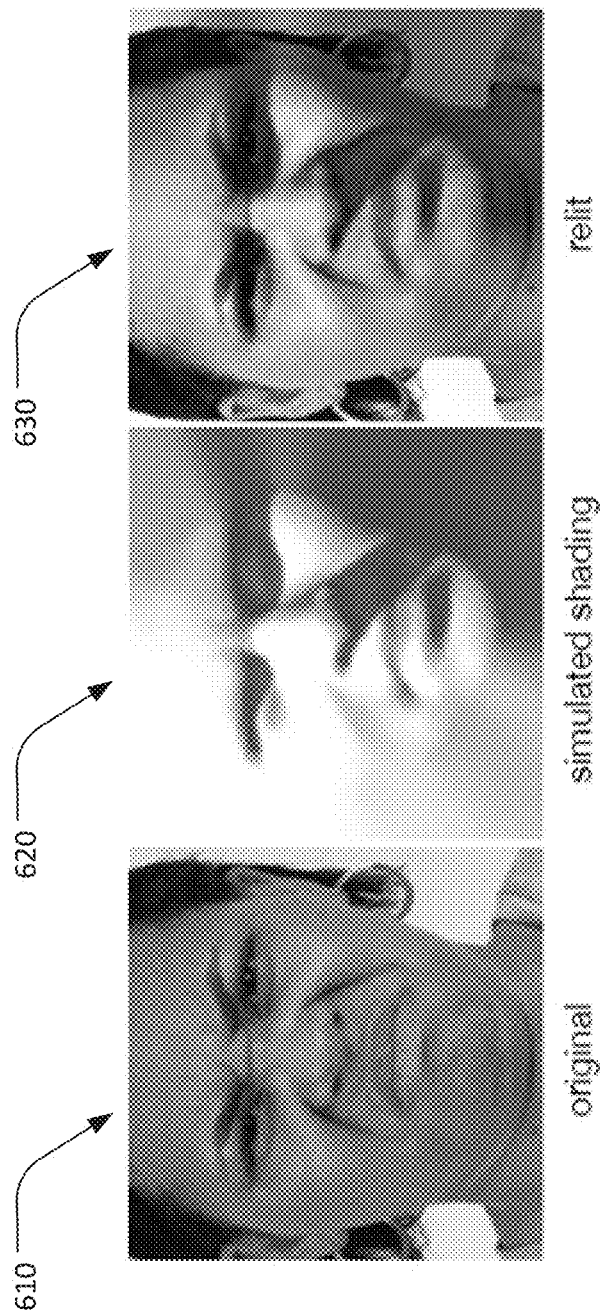
FIG. 6 is an example of simulated training data for lighting normalization.

To train the network, a large volume of synthetic illumination data was produced via portrait relighting. For each database picture in the training data that is captured under uniformly lit white illumination, a three-dimensional morphable face model was fit. Directional lighting and image-based lighting using custom OpenGL/GLSL shaders implementing soft shadows, microfacet specularities, and subsurface scattering were used to simulate a wide range of scene illuminations. Ten lighting variations (five random directional lighting and five random HDR environments) per subject were created, which lead to 100K training image samples in total. To relight eyes and teeth realistically, a billboard geometry for the eyes and mouth interiors was created, and inpainting was performed on the shading image to relight partially visible hair on the face. FIG. 6 shows an example of simulated training data with lighting normalization, including an original image 610, simulated shading 620, and a relit image 630. To further increase robustness, random contrast and brightness perturbations were added to simulate poor quality input.

For the training, a multi-scale L1 pixel difference loss and an adversarial loss was used as follows:

$$L = L_{adv} + \lambda_{l1} L_{\ell 1} \quad (4)$$

$L_{\ell 1}$ evaluates pixel differences at multiple scales to ensure globally consistent skin color estimation. Specifically, $$L_{\ell_1} = \sum_{k=1}^{K} \|I_{gt}^k - I_{lit}^k\|$$

$L_{adv}$ is a multi-scale adversarial loss.

$$L_{adv} = \mathop{\mathbb{E}}_{(I,S,I_{gt})}[\log D_k(I, S, I_{gt}^k)] + \mathop{\mathbb{E}}_{(I,S)}[\log(1 - D_k(I, S, I_{lit}^k))]$$

where $\{D_k\}_{k=1}^{K}$ are discriminators trained on different image scales to detect local and global artifacts. For both losses, the error was evaluated on an image pyramid with K=2 levels, where $I^2_{\{gt,lit\}}$ are down-scaled to ¼ width and height of the original images $I^1_{\{gt,lit\}}$ (128 and 512 resolution in this experiment). $\lambda_{l1}$=20 was an experimental value that was used.

As the network predicts normalized appearances only inside the facial region, Poisson image blending was used as a post-process to composite the normalized image seamlessly into the background. The resulting image is lit neutrally (i.e., naturally or evenly, as opposed to from an odd angle, or in such a way that the remaining processes would return unusual results.

The evenly lit face then undergoes expression neutralization, which consists of geometry neutralization and facial texture neutralization, each of which is addressed by a dedicated deep neural network.

Figure 7:
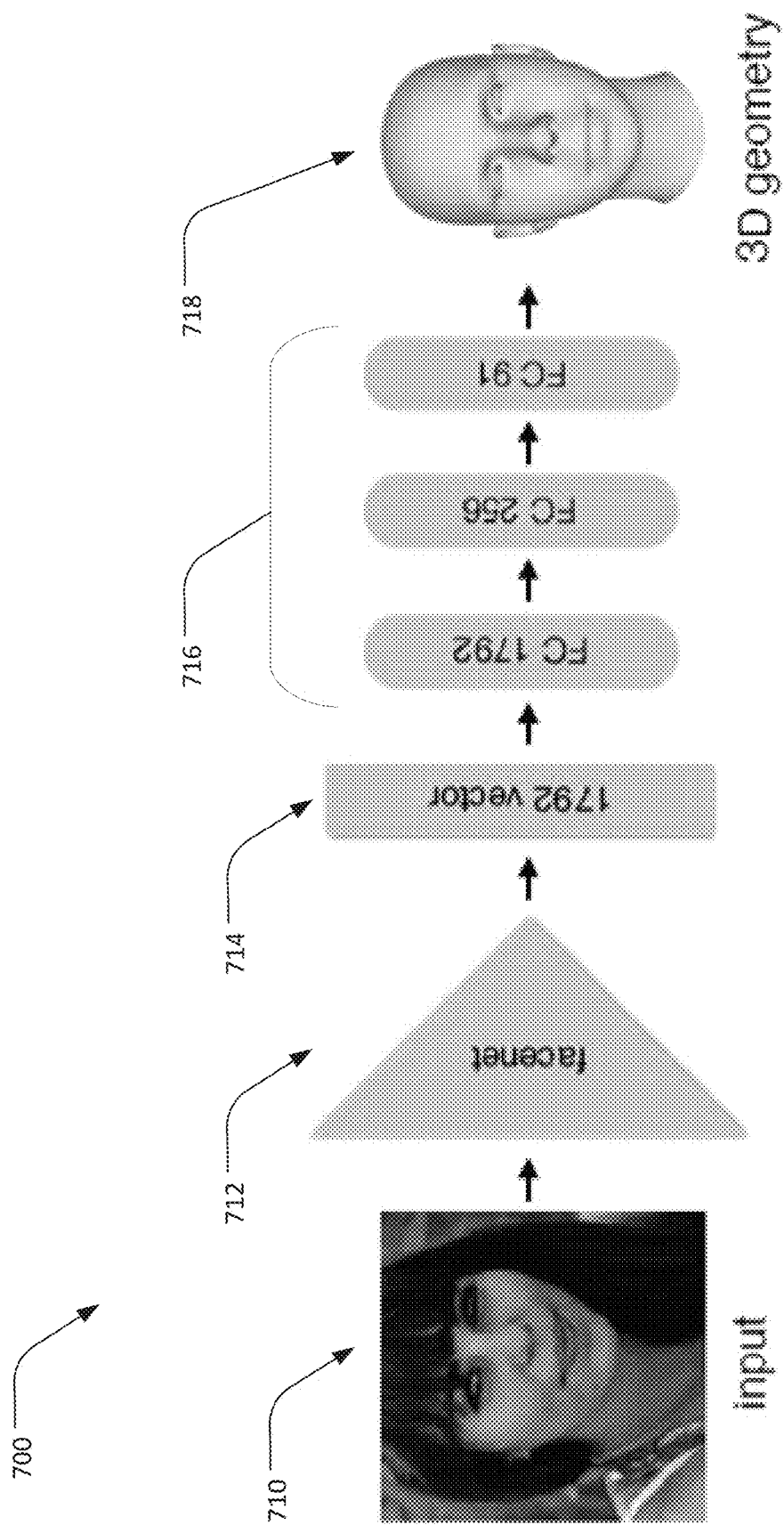
FIG. 7 is a functional diagram of a geometry neutralization network.

FIG. 7 is a functional diagram of a geometry neutralization network 700 (i.e., a regression network) used for generating a geometry neutralized face. An evenly lit input face 710 (e.g., from the work done with reference to FIG. 6) is used to infer a neutralized three-dimensional geometry model 718. To infer a neutralized facial geometry, the geometry neutralization network 700, which can infer identity parameters of a three-dimensional morphable face model, is first trained using facial recognition features of input images with three-dimensional models. Synthetic faces are generated for training data augmentation. The geometry neutralization network 700 can then infer the neutralized three-dimensional geometry model 718 from the evenly lit input face 710.

α is the identity coefficient of a linear three-dimensional morphable model for the input I. The geometry neutralization network 700 is trained with multi-layer perceptron (MLP) layers R(C) 716 that take the facial features C to predict α(|α|=91). For the facial recognition features C, 1792-D vectors 714 extracted from the last pooling layer using a convolutional neural network (e.g., a convolutional neural network trained on more than a million images that is 164 layers deep and has learned rich feature representations for a wide range of images, such as Inception ResNet v1) were used. Training the geometry neutralization network 700 requires pairs of input facial recognition features and ground truth three-dimensional geometry. Features are extracted from a pre-trained facial recognition network 712 and three-dimensional face fitting results with known camera and subject distances are used to produce the training data. The network is trained with the following loss:

$$L = \lambda_{pos}L_{pos} + \lambda_{land}L_{land} + \lambda_{prior}L_{prior} + \lambda_{sym}L_{sym}$$

$L_{pos}$ presents the per vertex position distance in three-dimensional between the ground truth mesh $P_{gt}$ and predicted mesh P:

$$L_{pos} = \|P_{gt} - P\|^2$$

$L_{land}$ is similar to $L_{pos}$, but measured on a subset of 68 vertex positions corresponding to facial features.

$L_{sym}$ is a facial symmetry loss that minimizes the distortion by computing the difference of each corresponding pair of vertices $(l,r) \in \mathcal{L}$ on the left and right side of the face after flipping both to the same side.

$$L_{sym} = \sum_{(l,r) \in \mathcal{L}} \||P^l| - |P^r|\|^2$$

$L_{prior}$ accounts for the error between the predicted and ground truth blendshape coefficients:

$$L_{prior} = \|\alpha_{gt} - R(C)\|^2$$

The geometry neutralization network 700 employs three layers of MLP with Leaky ReLu nonlinearities 716 with leakiness 0.2. In experiments, $\lambda_{pos}$=2, $\lambda_{land}$=0.01, $\lambda_{prior}$=0.01, and $\lambda_{sym}$=0.01. Since the geometric loss formulation is generic, it is not limited to linear models, and more sophisticated ones can be used. While there is an immense amount of training samples, the training dataset only contained 1K unique facial identities, which can lead to overfitting during training. To augment the variation of unique facial identities, novel identities were synthesized by interpolating two identities continuously using features from a GAN that produces convincing portraits of fake human faces (e.g., a fake face GAN such as StyleGAN). Only frontal faces of new identities with blank expressions were generated for the data augmentation since the deep facial recognition network 712 is robust to expressions and pose variations. This identity augmentation was performed on the training dataset and created 160K new subjects, resulting in 170K training data samples. The base training data and the augmented data were mixed with the ratio of 1:2 during the training.

Figure 8:
FIG. 8 is a set of examples of interpolation of two neutral faces to synthesize new additional people for dataset augmentation.

The fake face GAN was used to interpolate two neutral faces to synthesize new fake people to augment the number of neutral subjects in the dataset, as shown in FIG. 8. This task was formulated as a latent space embedding problem. In particular, given an arbitrary image, a representative latent vector w was extracted, which can be used as an input of the fake face GAN and generate the same image. Two images, Input A and Input B, are embedded into the latent space and two latent vectors w1 and w2, reconstructed A and reconstructed B, respectively, were obtained. Then, a linear function is used to interpolate the latent vector w=λw1+(1−λ)w2 and a new image can be generated using the new vector w. Given a real image $I_r$, a random latent vector w and the fake face GAN(w) are initialized to generate a random synthetic image $I_f$. With a pre-trained model for perceptual loss, this method minimizes the perceptual loss between $I_r$ and $I_f$ by freezing both generators and perceptual model weights, and optimizing w using gradient descent. The intermediate latent space (18 layers and each layer is a 512 vector) of fake face GAN are optimized and an output layer of a convolution neural network (e.g., block4_conv2 of VGG-16) can be used for the perceptual loss. The embedding and interpolation results for λ=0.75, λ=0.5, and λ=0.25 are shown in FIG. 8. The mean interpolation results are added to the dataset and 160K new subjects are created. The fake face GAN augmentation is used to train the geometry neutralization network 700.

The geometry neutralization network is trained using the data as described above. Once the geometry neutralization network 700 is trained, the neutralized three-dimensional geometry model 718 is determined by the geometry neutralization network 700 from the evenly lit input face 710.

FIG. 9 shows a comparison of images of faces with variants of geometry neutralization. Inputs 910 are shown in the first row. Example outputs with naively reset expressions to zero 912 are shown in the second row. Example outputs with geometry neutralization without data augmentation 914 are shown in the third row. Example outputs with geometry neutralization with data augmentation 916 are shown in the fourth row with the best results.

Figure 10:
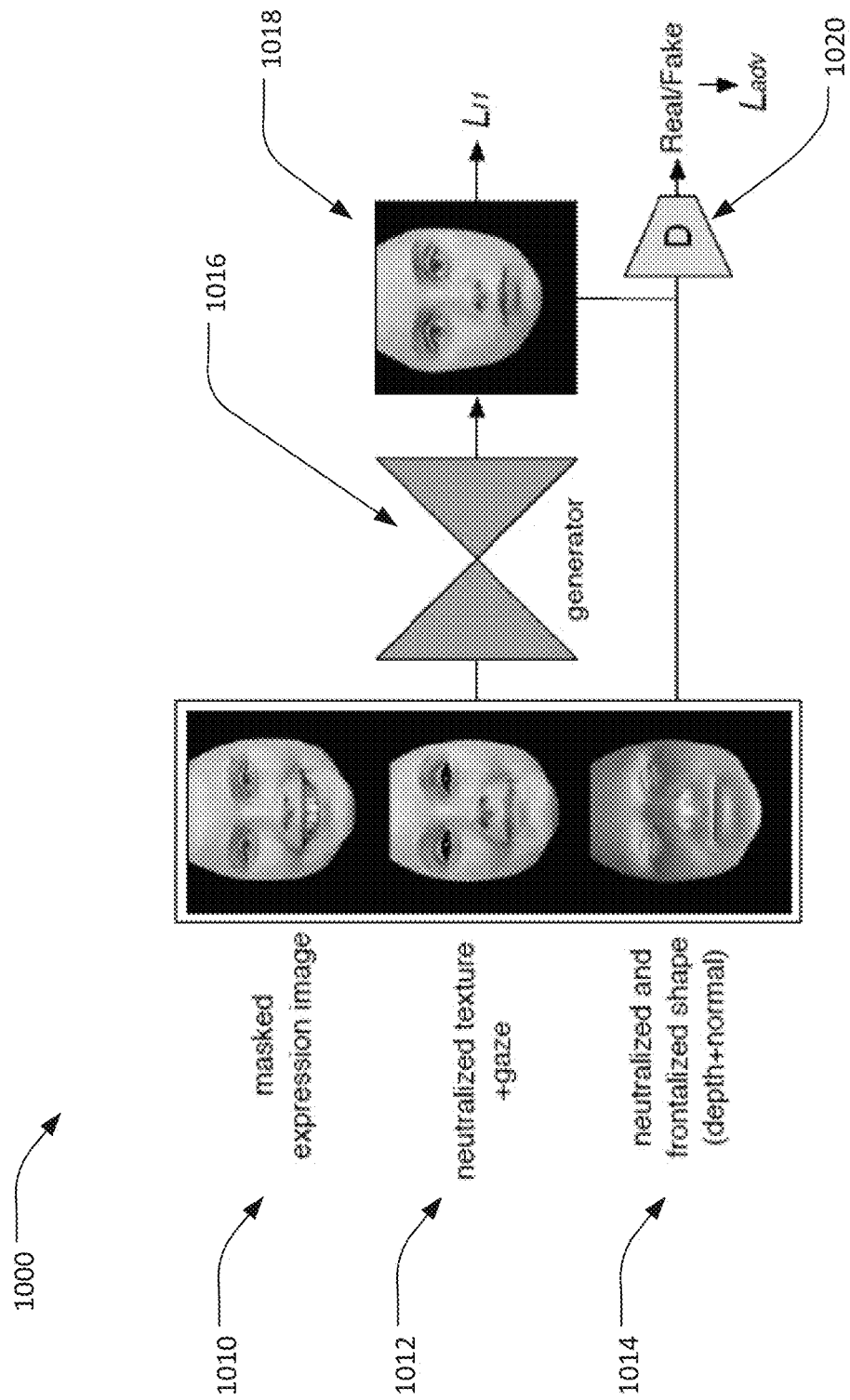
FIG. 10 is a functional diagram of a facial texture neutralization network.

FIG. 10 shows a functional diagram of a facial texture neutralization network 1000 that, once trained, neutralizes facial texture of a geometry neutralized face in an input image. Facial texture neutralization (including pose and expression neutralization) is achieved using a novel generalized variant of a photorealistic expression synthesis network. For facial expression neutralization, a photorealistic neutral expression image of a face 1018 is synthesized from arbitrary facial expressions and pose of a person. Given the neutralized geometry 1014 inferred from the geometry neutralization network 700 (shown as 718 in FIG. 7), masked expression image 1010, and the UV expression texture 1012 from the light normalization network 500 (shown in FIG. 5), the face is frontalized by resetting the rotation component to neutral (based on training) and rendering the normal/depth image and the expression texture on the neutralized geometry with even lighting to create images with properly lit and modeled faces for conditioning generator 1016. The conditioning generator 1016 can then generate a neutral texture to lay over the face to generate the neutral expression face 1018.

Training with naively provided pairs of input expressions and their corresponding neutral faces does not produce a high-quality result. Unlike facial expression synthesis from a neutral photograph, the neutralization training target needs to predict one exact neutral from a wide range of facial expressions. A photoreal avatar generative adversarial network (paGAN) trained from a neutral input picture to a range of output facial expressions is better at preserving person-specific identity features. Thus, a generalized version of paGAN is trained by mixing both neutral-to-expression and expression-to-neutral datasets. In this way, the network can learn the neutralization task (i.e., remove wrinkles, inpaint occluded areas, and synthesize plausible eyes) while better preserving the likeness of the person after inference. To train the generalized paGAN, the network was initialized using a pre-trained paGAN. For side-facing training images, a naive facial texture computation with projection causes large visual artifacts in invisible or occluded areas. This was addressed by identifying invalid facial areas via facial symmetry, followed by Poisson blending and inpainting to recover from the artifacts. The model is trained using the following loss function:

$$L = L_{adv} + \lambda_{\ell 1} L_{l1} + \lambda_{Id} L_{Id}$$

where $L_{adv}$ and $L_{\ell 1}$ are the multi-scale adversarial and pixel loss from the lighting translation network 500 of FIG. 5, and $L_{Id}$ is an identity loss that minimizes features of the last pooling layer and fully connected layer of a pre-trained facial recognition network. $\lambda_{l1}=20$ and $\lambda_{Id}=0.25$. Similarly to the geometry neutralization training, data augmentation is performed to train the generalized paGAN. While the synthetic faces interpreted by the fake face GAN are realistic with background and hair, there are also high-frequency artifacts, which are not suitable when learning high-fidelity textures. Thus, a different data augmentation was performed to increase the identity variations by blending the three-dimensional geometry and UV texture. Training a texture neutralization network requires pairs of neutral and expression photos. Thus, synthetic expressions were created using a pre-trained paGAN model. 6 key expressions were used. In total, this augmentation produces around 90K identities each with 6 expressions. During training, synthetic faces and real photos from our training data were mixed with a ratio of 1:2.

Figure 11:
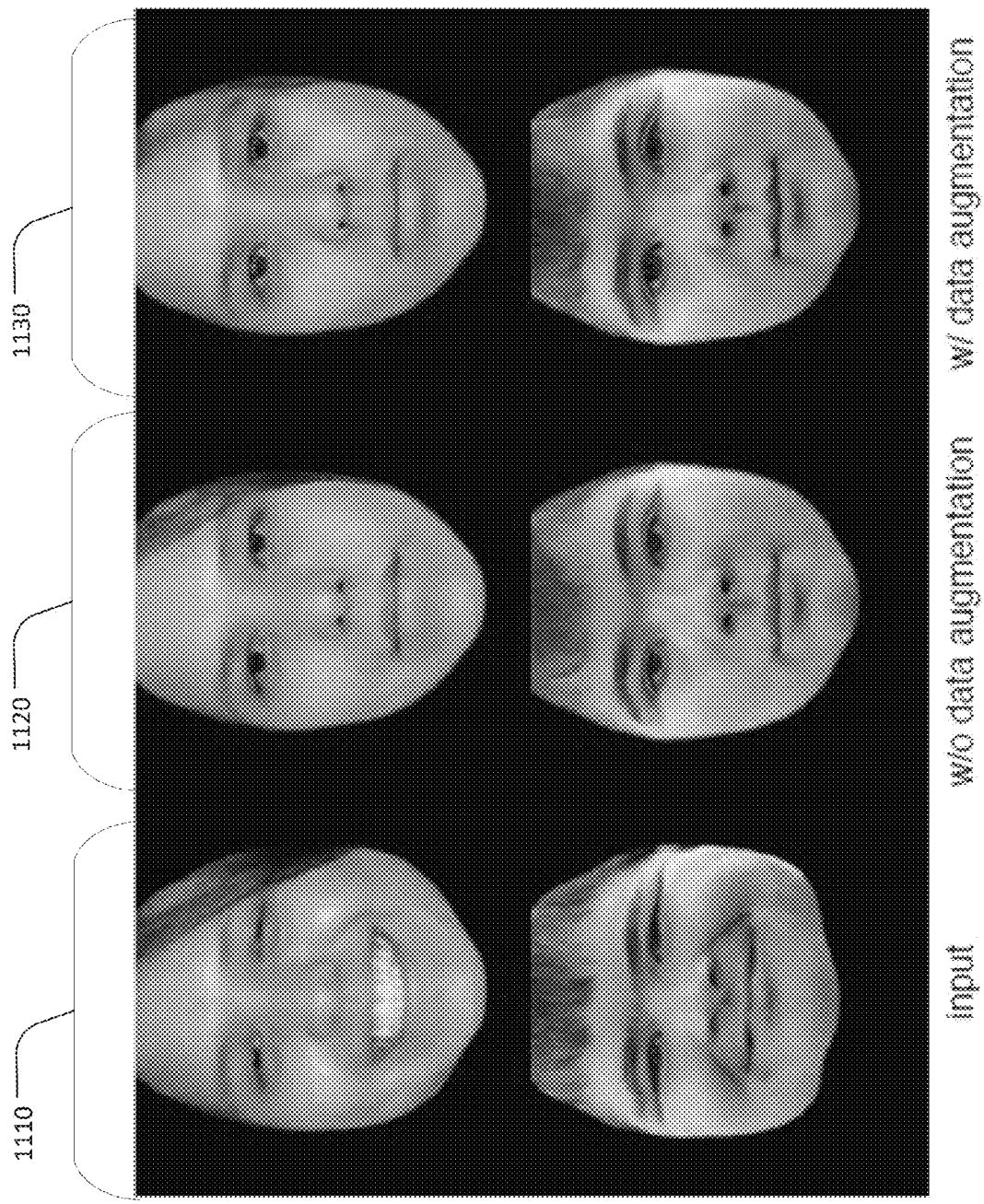
FIG. 11 shows the effects of data augmentation on the facial texture neutralization network.

FIG. 11 shows the effects of data augmentation on the facial texture neutralization network. The first column has example inputs 1110, the second column has example images produced a facial texture neutralization network that was trained without data augmentation 1120, and the third column has example images produced with a facial texture neutralization network that was trained with data augmentation 1130. The examples with data augmentation are more realistic than the examples without data augmentation. The data augmentation is relatively low cost, but significantly increases the accuracy and robustness of the network.

Fake frontal neutral faces are synthesized which include both geometry and texture, and then paGAN is used to create expressions for these synthetic faces. Given a frontal face image I, a three-dimensional morphable model is fit to the image to obtain the initial three-dimensional mesh data $MI=(\alpha_I, \beta_I, T_I)$, where $\alpha_I$ and $\beta_I$ are the corresponding identity and expression coefficients, respectively. The face texture $T_I$ is then computed, which is unwrapped from I to UV-space. Given two face images A, B and their mesh data $M_A$, $M_B$, the coefficients and textures of the two faces are interpolated independently. Given $M_A=(\alpha_A, \beta_A, T_A)$ and $M_B=(\alpha_B, \beta_B, T_B)$, a new face $M_N$ is generated as $M_N=(\lambda\alpha_A+(1-\lambda)\alpha_B, \lambda\beta_A+(1-\lambda)\beta_B, \lambda T_A+(1-\lambda)T_B)$, with $\lambda \in [0, 1]$. Given a seed face A, a target face B is selected from one of the k=200 nearest neighbors of A, and these are interpolated to obtain a new face with three-dimensional mesh. The measurement for the distance between A and B is $$d(A,B) = \theta \|L_A - L_B\| + \|T_A - T_B\|$$

where L are matrices of two-dimensional landmarks. In one example, θ=10.0. λ=0.5 to produce faces that are as different as possible, and repetitive image pairs were ignored.

Figure 12:
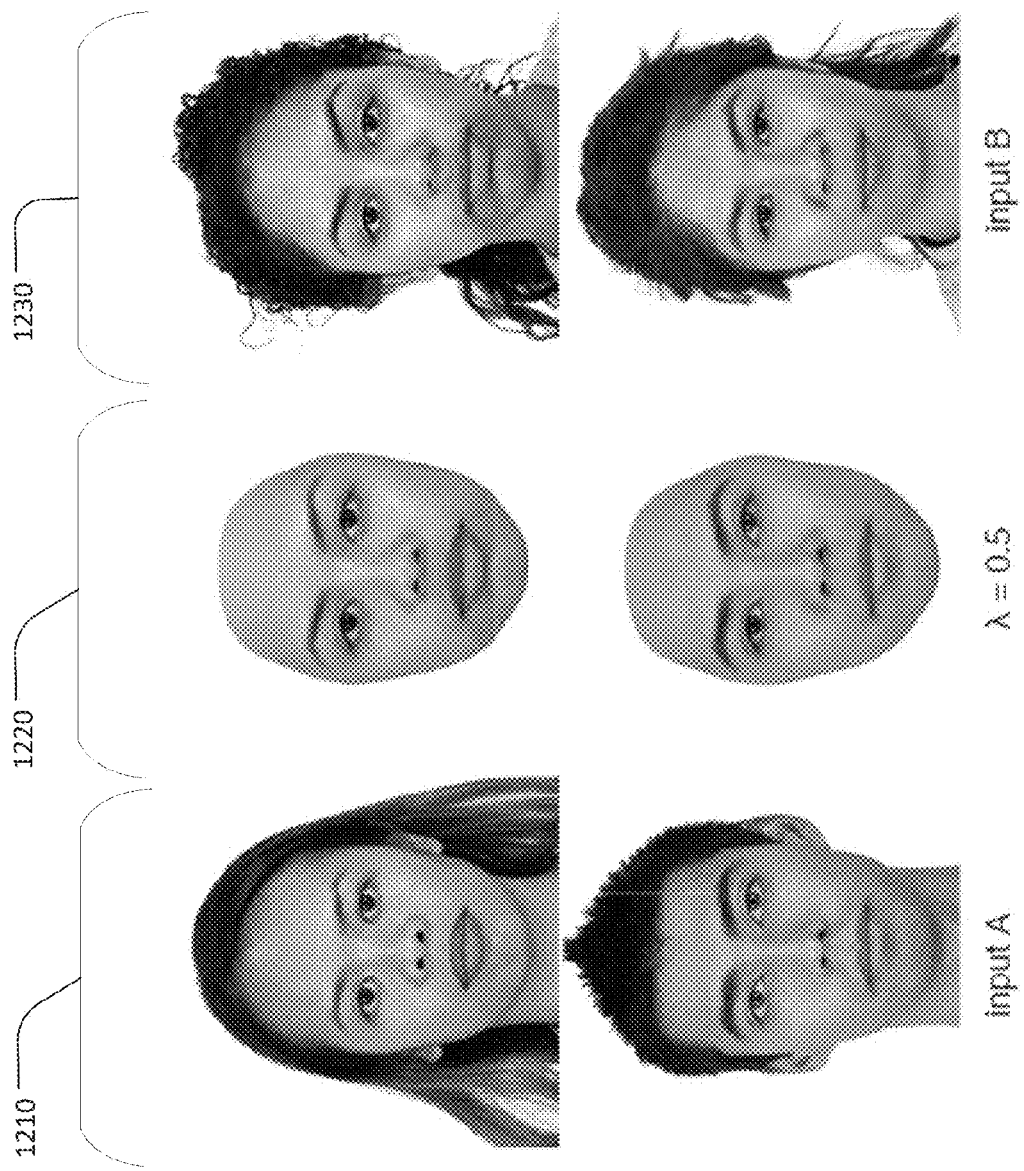
FIG. 12 shows blending results of interpolation of two neutral subjects' geometries and textures to synthesize new additional people for dataset augmentation.

The blending results are shown in FIG. 12. Face A is shown in column 1210, face B is shown in column 1230, and the new face interpolated from face A and face B is shown in column 1220. Interpolation enables the creation of unique faces for augmentation of the data set without requiring unique additional input.

After the facial expression is normalized, the face can be optionally composited to the background for portrait manipulation applications. The background is warped using two-dimensional flow derived from three-dimensional mesh correspondence before and after geometry normalization and the face region is composited to the background using Poisson blending.

Applications

Applications include portrait manipulation, normalized face reconstruction, image-based three-dimensional avatar creation, and improved three-dimensional facial animation.

Figure 13:
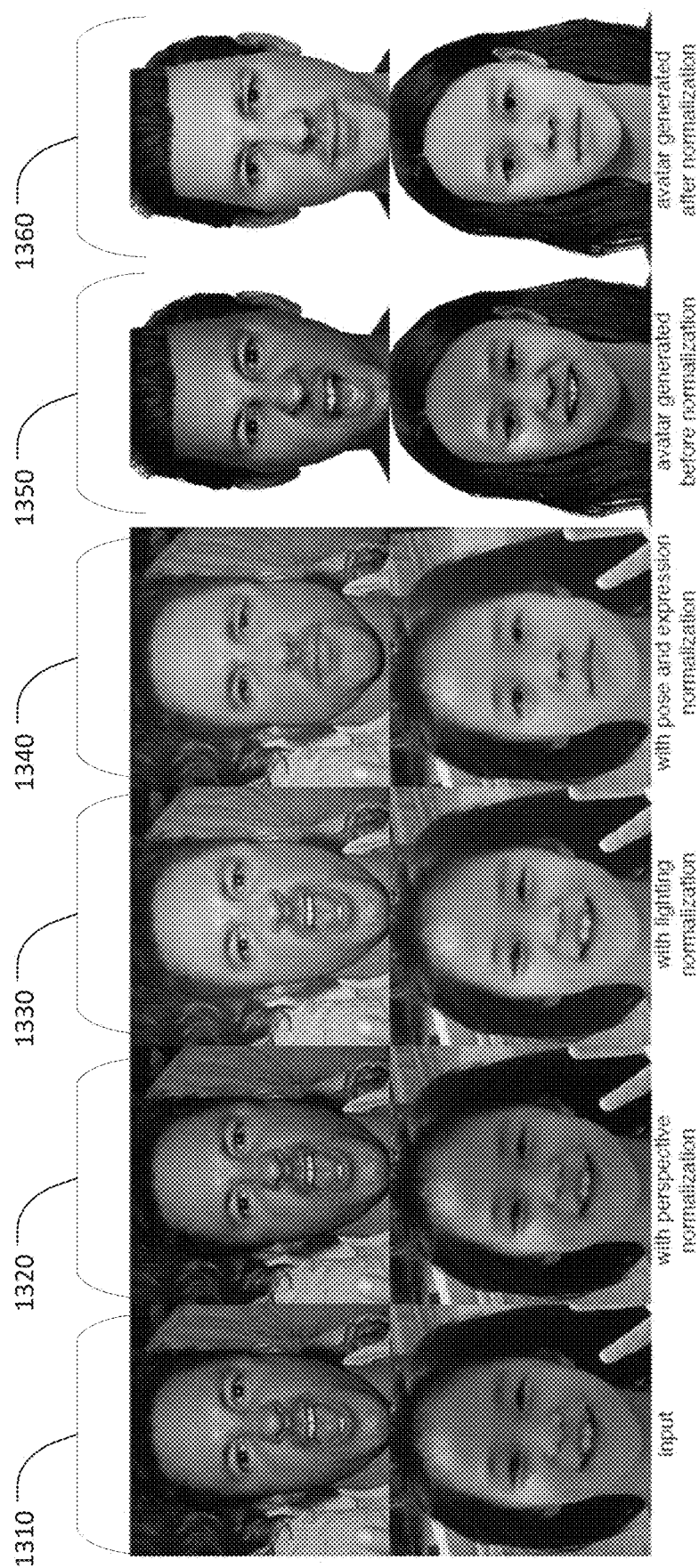
FIG. 13 shows portrait image manipulation, including input images, images with perspective undistortion, images with lighting normalization, and images with expression frontalization and neutralization.

Since these networks are modular or independent of one another, perspective undistortion, lighting normalization, and neutralization of expression can be applied individually to achieve portrait manipulation. FIG. 13 demonstrates portrait manipulation, where input images are shown in column 1310, images with perspective undistortion are shown in column 1320, images with lighting normalization are shown in column 1330, and images with expression neutralization are shown in column 1340. Images with an avatar generated before perspective undistortion, lighting normalization, and neutralization of expression are shown in column 1350. Images with an avatar generated after perspective undistortion, lighting normalization, and neutralization of expression are shown in column 1360.

Figure 14:
FIG. 14 shows other portrait image manipulation with input images, images with perspective undistortion, images with lighting normalization, and images with expression frontalization and neutralization.

FIG. 14 demonstrates portrait manipulation results where input images are shown in column 1410, images with perspective undistortion are shown in column 1420, images that additionally have lighting normalization are shown in column 1430, and images that further have expression neutralization are shown in column 1440. Images with an avatar generated before perspective undistortion, lighting normalization, and neutralization of expression are shown in column 1450. Images with an avatar generated after perspective undistortion, lighting normalization, and neutralization of expression are shown in column 1460.

Figure 15:
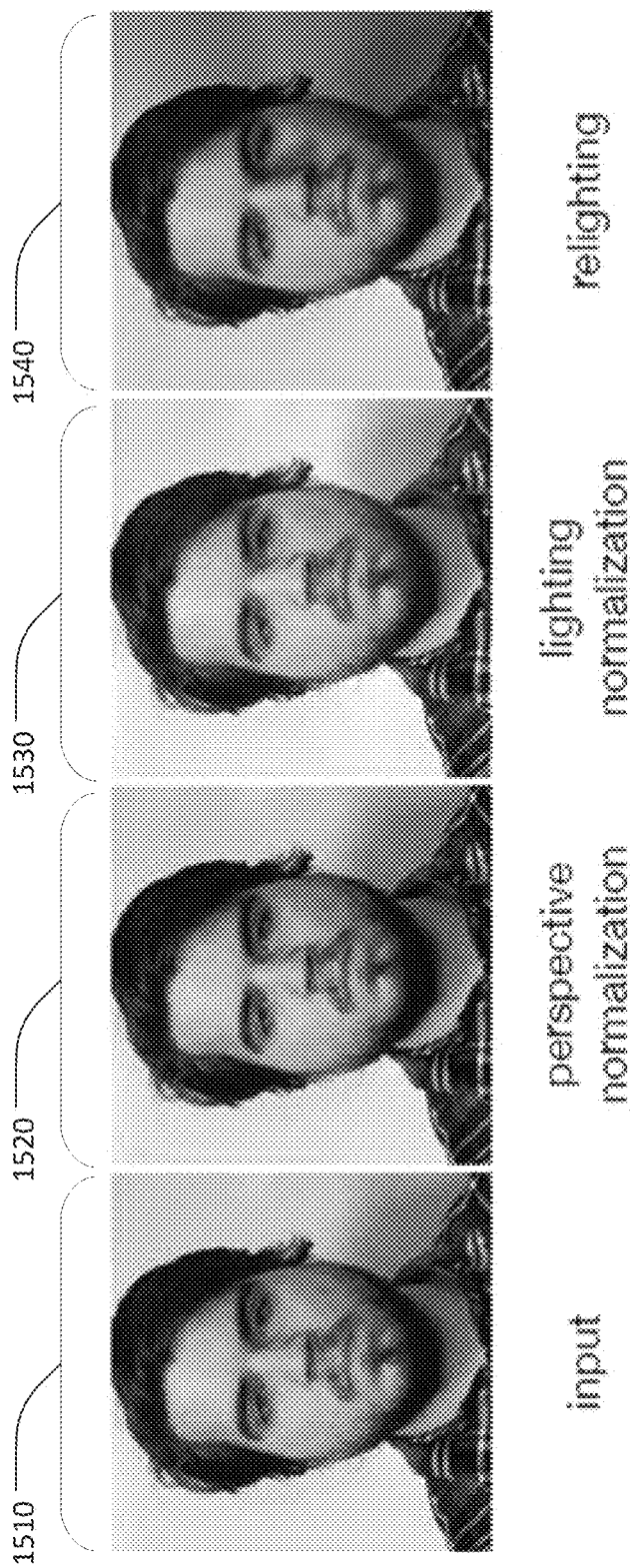
FIG. 15 shows portrait manipulation results with an input image, an image with perspective undistortion, an image with lighting normalization, and a relit image.

FIG. 15 demonstrates portrait manipulation results with an input image 1510, an image with perspective undistortion 1520, and an image that additionally has lighting normalization 1530. After the lighting is normalized, the portrait can be re-lit with an arbitrary lighting condition 1540 using auxiliary three-dimensional geometry and texture obtained as part of the lighting normalization process.

Normalized portraits are suitable for image-based virtual avatar modeling tasks and are key for producing visually pleasing and high-fidelity results robustly. An undistorted input ensures accurate avatar geometry, normalized lighting produces a texture that can be re-lit with novel illuminations, and expression normalization enables correct facial animations, all of which are important for consumer accessible virtual avatars.

In the context of crime investigation and counter-terrorism, there are often limited pictures of suspects or kidnapped persons. Graphical representations such as facial composites are often used to provide additional depictions of how these subjects may look. In cases when the person is performing an expression (e.g., a smile) and the picture is taken in an uncontrolled lighting environment, this method can show how a normalized face can provide additional information for identification and recognition.

Figure 16:
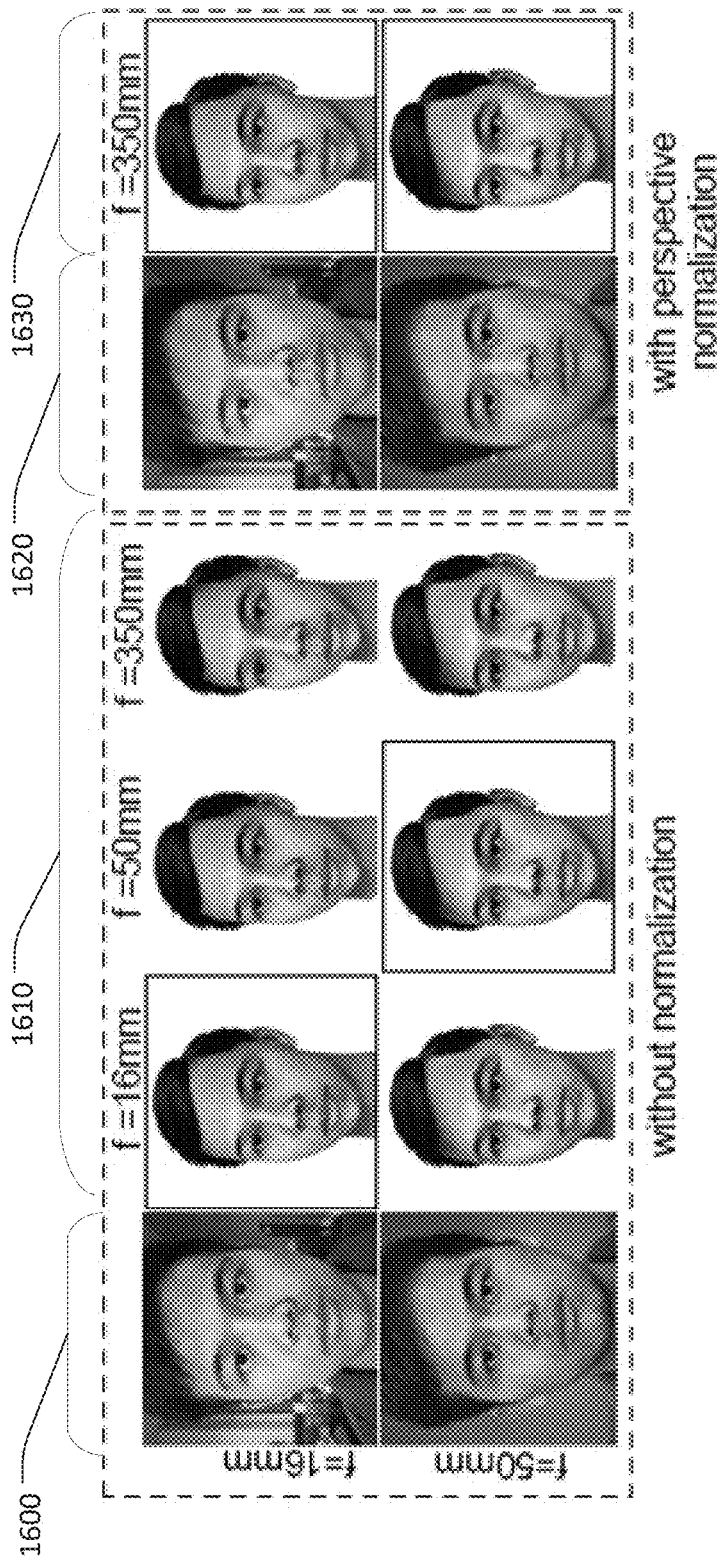
FIG. 16 shows generated avatars using the original images without normalization and with images having perspective normalization.

In FIG. 16, the generated avatars 1610 using the original images without normalization 1610 and the generated avatars 1630 with images having perspective normalization 1620 are shown. Without perspective normalization, generated avatar shapes can exhibit large variations, and using wrong focal lengths f can produce avatars with wrong shapes (i.e., face becomes too wide or narrow). three-dimensional face modeling can still produce correct avatar shapes using the correct focal length (indicated with black boxes), but usually it is unknown in advance for unconstrained portraits. The normalization removes the perspective distortion of the input image and the facial modeling produces plausible geometry with fixed focal length f (350 mm in 35 mm in our case), which closely matches to the one created with the original image and the correct focal length.

Figure 17:
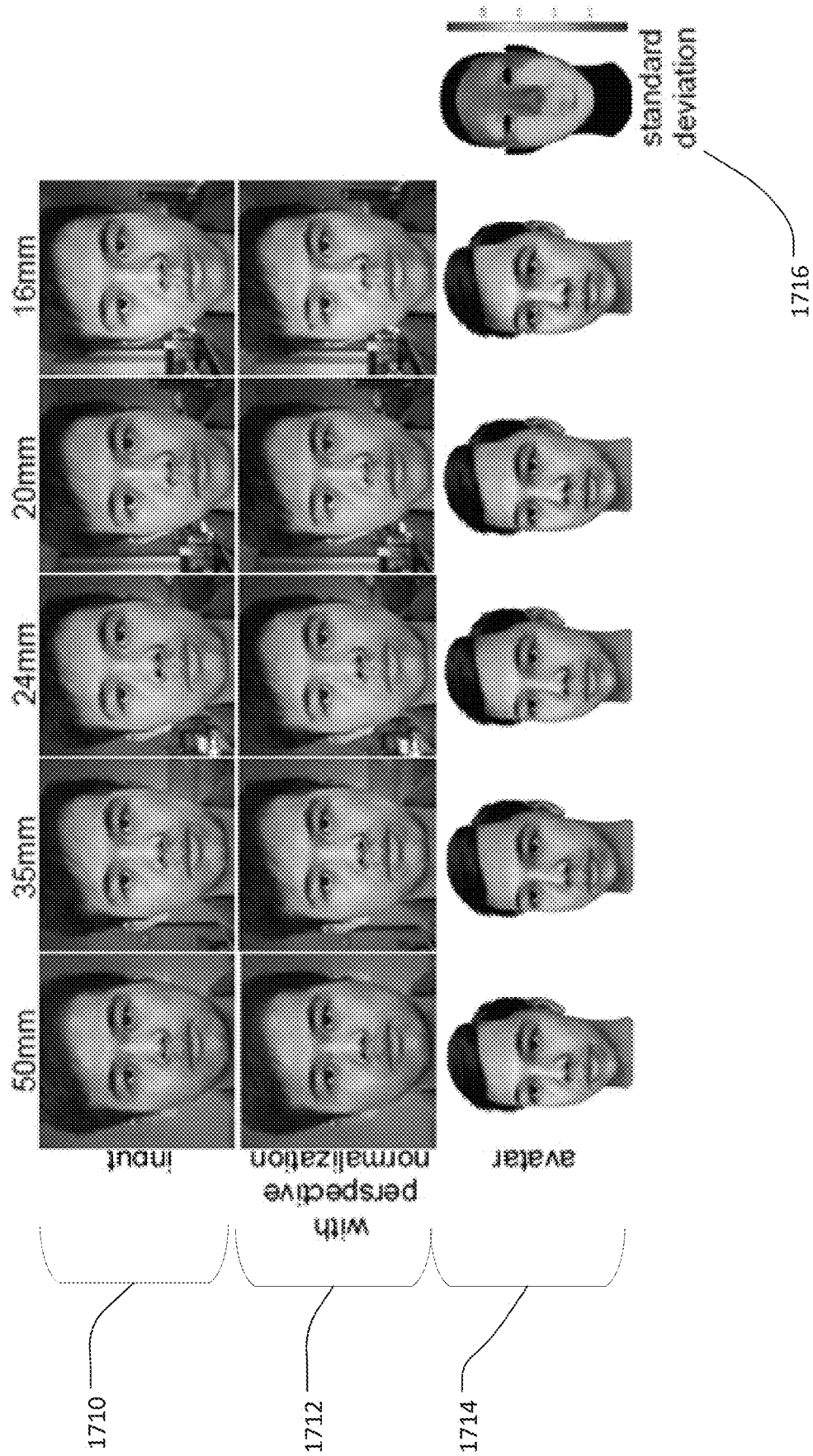
FIG. 17 shows robustness of perspective undistortion in distorted input images from near to far distances.

The robustness of the perspective undistortion is shown in FIG. 17 using a variety of distorted input images from near to far distances 1710, which show variations in facial proportions. This method can produce consistent portraits 1712 after perspective undistortion, as well as consistent avatar geometries 1714. A heatmap 1716 shows standard deviations for per-vertex Euclidean distance among three-dimensional avatars. This is because this system and method accounts for focal length through the use of the undistortion process.

FIG. 18 shows a comparison of the present system with a naive lighting decomposition system using an estimated shading image 1820 on an input image 1810. Due to the inaccuracies of the reconstructed three-dimensional mesh and the limited capabilities of spherical harmonics, the naive decomposition 1830 exhibits significant artifacts, while the present method ensures high-fidelity output 1840.

FIG. 19 shows a comparison of lighting normalization systems using an input image 1910 for predicting the image $I_{lit}$ (without delta) 1920, 1930 and predicting only the offset $O_{lit}$ (with delta) 1940, 1950. Predicting $I_{lit}$ directly often yields significant loss in details.

Figure 20:
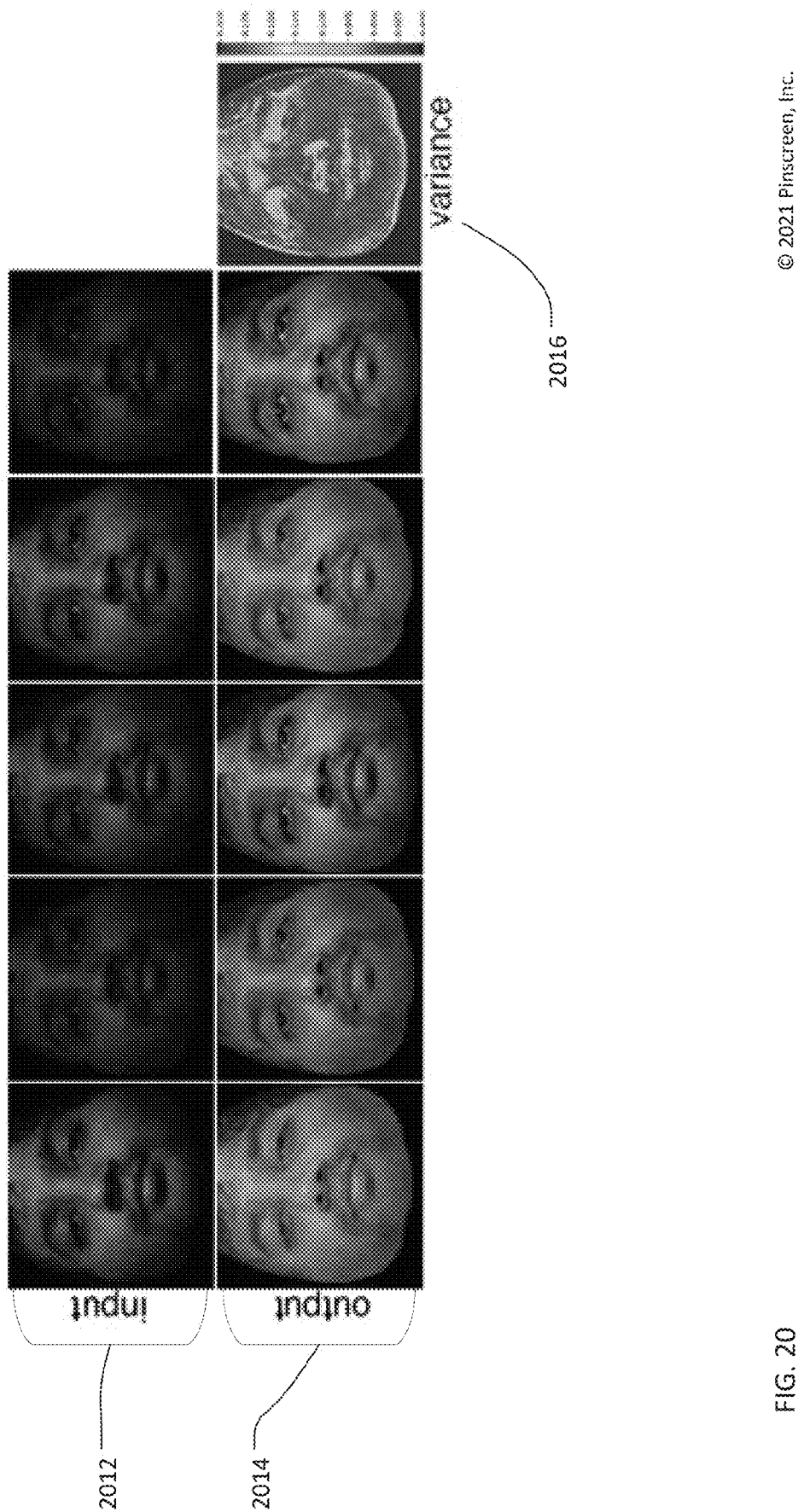
FIG. 20 shows a subject illuminated with a wide range of colored lighting conditions in the input images and corresponding images with normalized lighting.

FIG. 20 shows a subject illuminated with a wide range of colored lighting conditions in the input images 2012. The lighting has been normalized in the output images 2014 according to the present system and shows consistent facial skin tones. Image 2016 shows the variance of estimated pixel colors, showing the consistency of the estimation.

Figure 21:
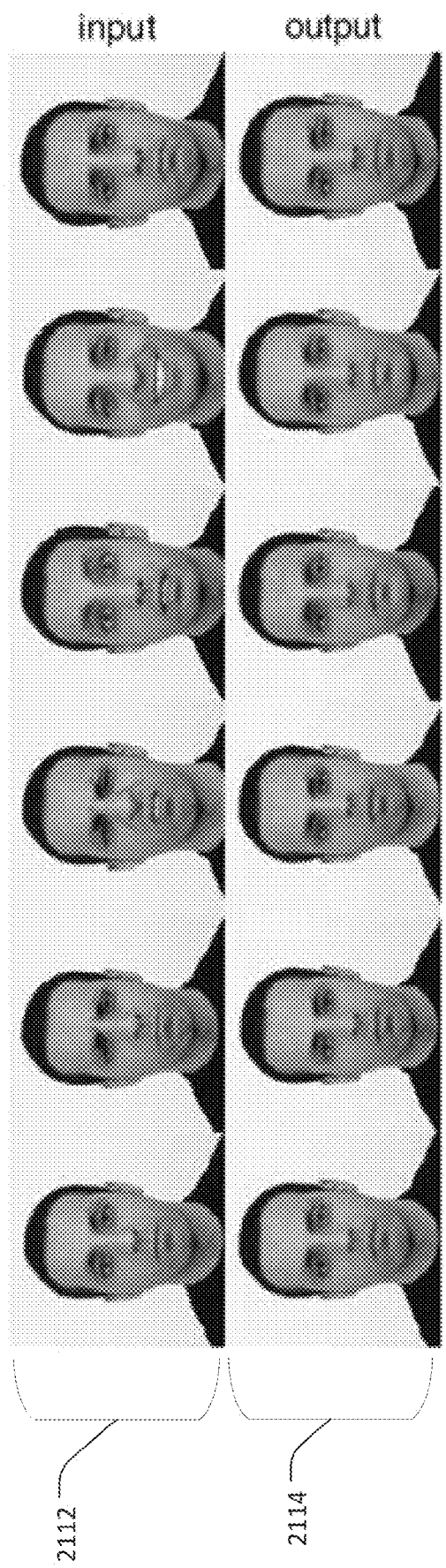
FIG. 21 shows a comparison of input images and neutralized expression output images.

The consistency of the expression neutralization system is shown in FIG. 21 with input images in the first row 2112 and neutralized output images 2114 in the second row. Although the input image expressions shown in the first row exhibit a wide variety of facial deformations and wrinkles, the system can produce neutralized expressions that are reasonably consistent, as shown in the second-row output images.

Description of Processes

Figure 22:
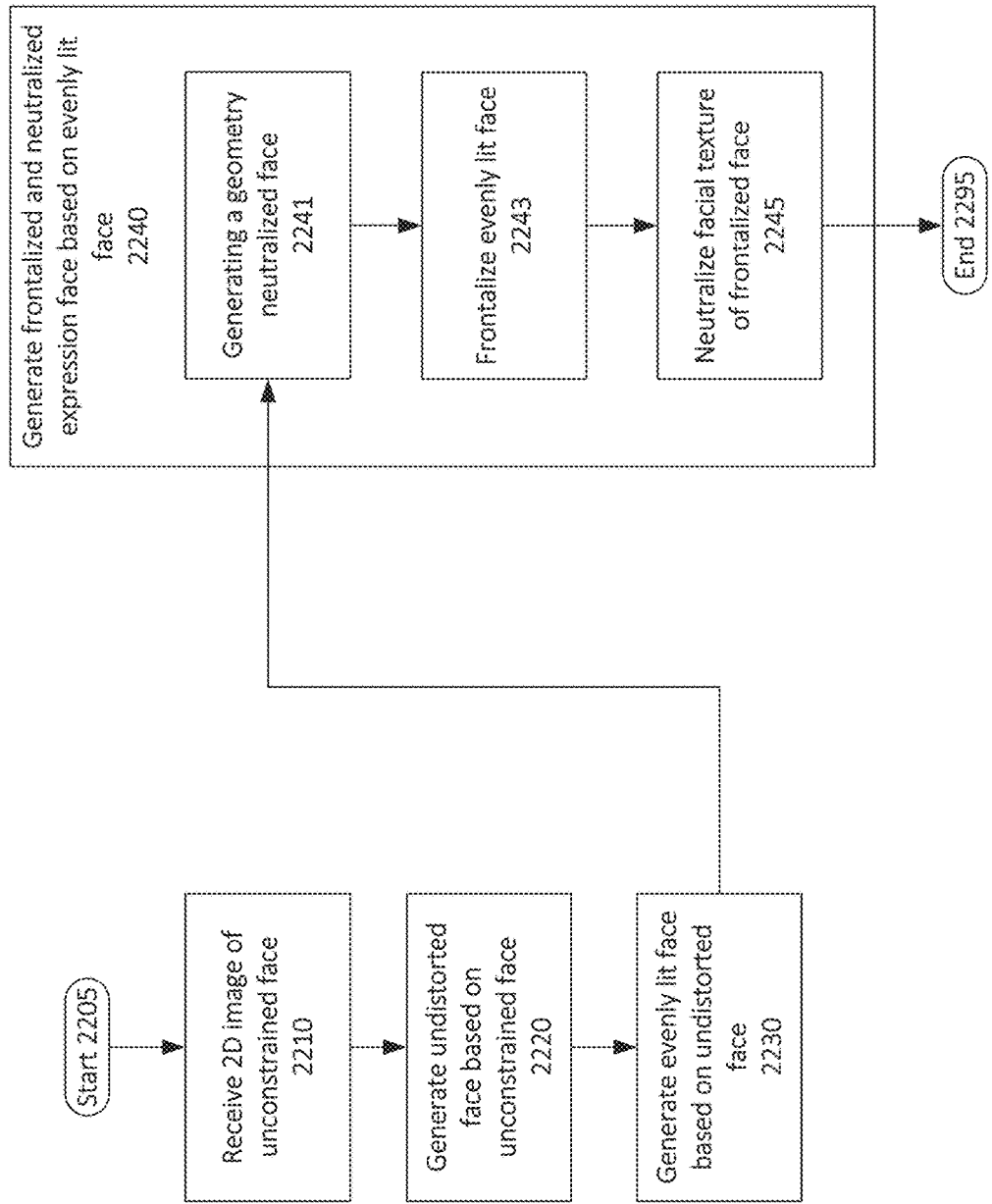
FIG. 22 is a flowchart of a process for generating a normalization of a two-dimensional image of an unconstrained human face.

FIG. 22 is a flowchart of a process for generating a normalization of a single two-dimensional image of an unconstrained human face. The process begins at start 2205 and continues until end 2295. The process is shown as a single iteration, but may take place many times, even many times in rapid succession. For example, multiple images may be fed into the system in rapid succession. The process of FIG. 22 assumes that the GANs have already been trained.

After the start 2205, the process begins with receipt of a single 2D image of an unconstrained face at 2210. This image may come from a still camera, a frame of video, or some other source. The image may have been type with various types of cameras at various angles and under unknown lighting conditions. Some portions of the face may be occluded due to the angle at which the image was taken, or hair or other objects covering portions of the face.

The unconstrained image is an image from which a neutralized face will be generated. As indicated above, generating a normalization of a single two-dimensional (2D) image of an unconstrained human face may preferably take place on a computer, like computing device 130, that is better suited to the operation of neural networks and to complex graphical renderings and mathematical calculations. As a result, the majority or all of the process described with respect to FIG. 22 may take place on such a computing device.

Figure 23:
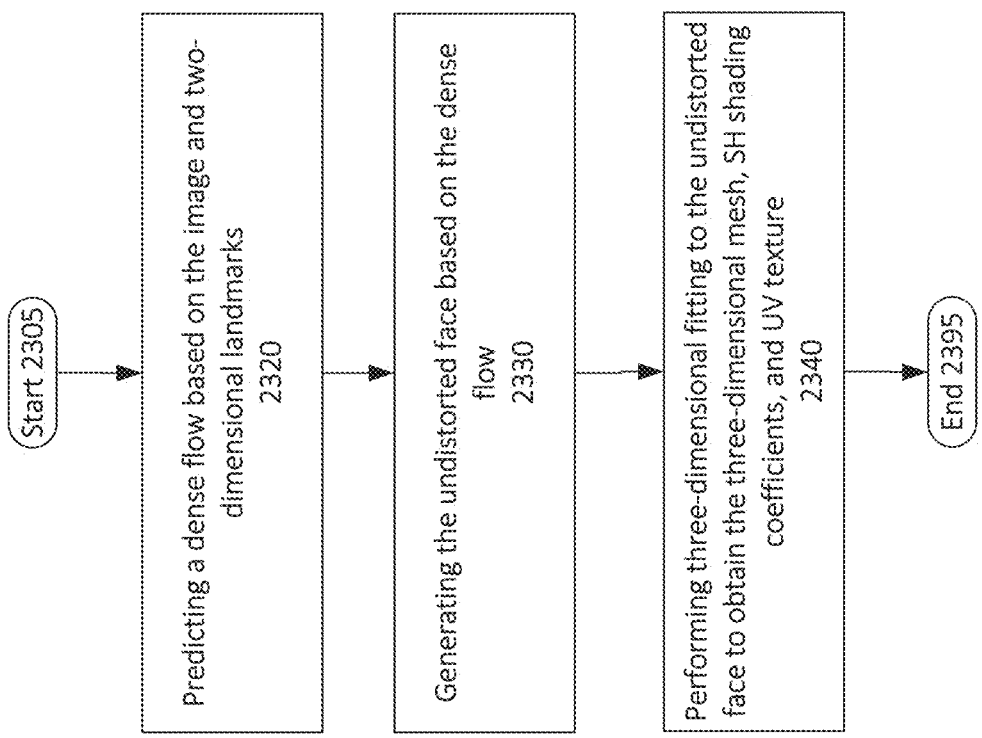
FIG. 23 is a flowchart of a process for generating an undistorted face based on a unconstrained face.

At step 2220, the process continues with the generation of an undistorted face based on the unconstrained human face, which is shown in detail in FIG. 23. The process begins at start 2305 and continues until end 2395. The undistorted face is generated by removing perspective distortion from the unconstrained human face via a perspective undistortion network. The perspective undistortion network is trained via dense flow fields by fitting three-dimensional face models to input images with known focal length and camera-to-subject distance. The perspective undistortion network is a GAN that predicts a dense 2D flow based on the image and two-dimensional landmarks detected in the image, as shown in step 2320. Next, an undistorted face is generated based on the dense flow, as shown in step 2330. Three-dimensional face fitting is then performed on the undistorted face to obtain a fitted three-dimensional mesh, the SH shading coefficients, and UV texture, as shown in step 2340.

Figure 24:
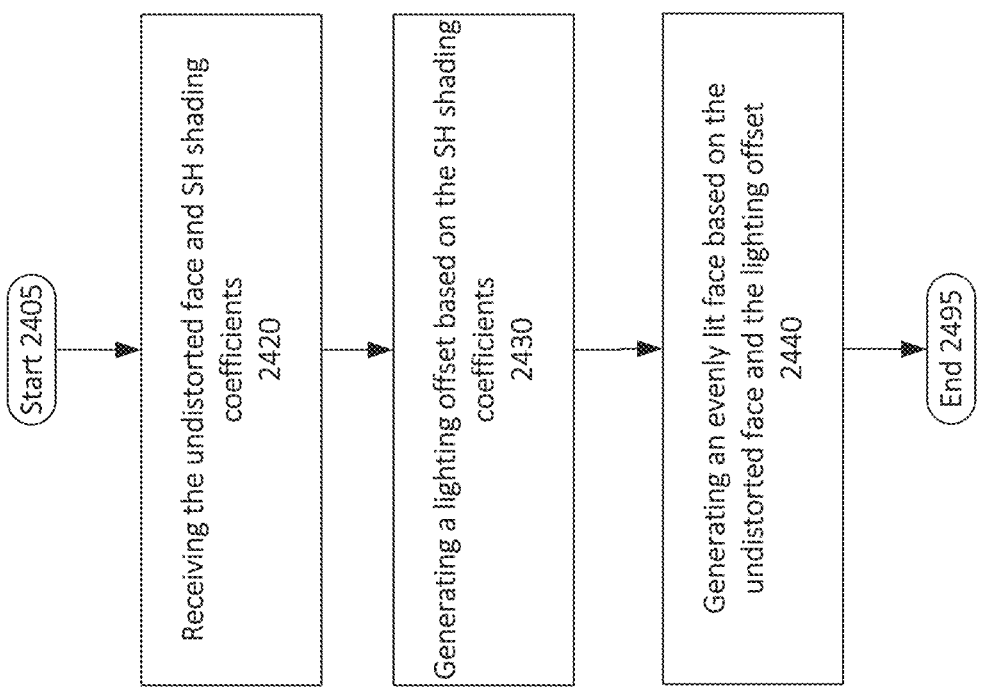
FIG. 24 is a flowchart of a process for generating an evenly lit face based on an undistorted face.

At step 2230, the process continues with the generation of an evenly lit face based on the undistorted face, which is shown in detail in FIG. 24. The process begins at start 2405 and continues until end 2495. The evenly lit face is generated by normalizing lighting of the undistorted face via a lighting translation network. The lighting translation network is a separate conditional GAN that uses the SH shading coefficients generated by three-dimensional fitting to generate the evenly lit face. The lighting translation network can be trained via synthetic illumination data based on portrait relighting. At step 2420, the lighting translation network receives the undistorted face and SH shading coefficients. At step 2430, the lighting translation network generates a lighting offset based on the SH shading coefficients. The lighting offset may be applied to the undistorted face to generate an evenly lit face. At step 2440, the lighting translation network generates an evenly lit face based on the undistorted face and the lighting offset.

At step 2240, the process continues with the generation of a frontalized and neutralized expression face based on the evenly lit face.

Step 2240 includes step 2241 of determining neutralized geometry of the evenly lit face, step 2243 of frontalizing the evenly lit face, and step 2245 of neutralizing facial texture of the frontalized face. These steps are shown in greater detail in FIG. 25. The geometry neutralization network can be trained via multi-layer perceptron layers based on pairs of input facial recognition features and ground truth three-dimensional geometry. The facial texture neutralization network can be trained based on expression-to-neutral and neutral-to-expression datasets. The frontalized and neutralized expression face is generated via an expression neutralization network that uses the UV texture from the three-dimensional face fitting to generate the frontalized and neutralized expression face.

Figure 25:
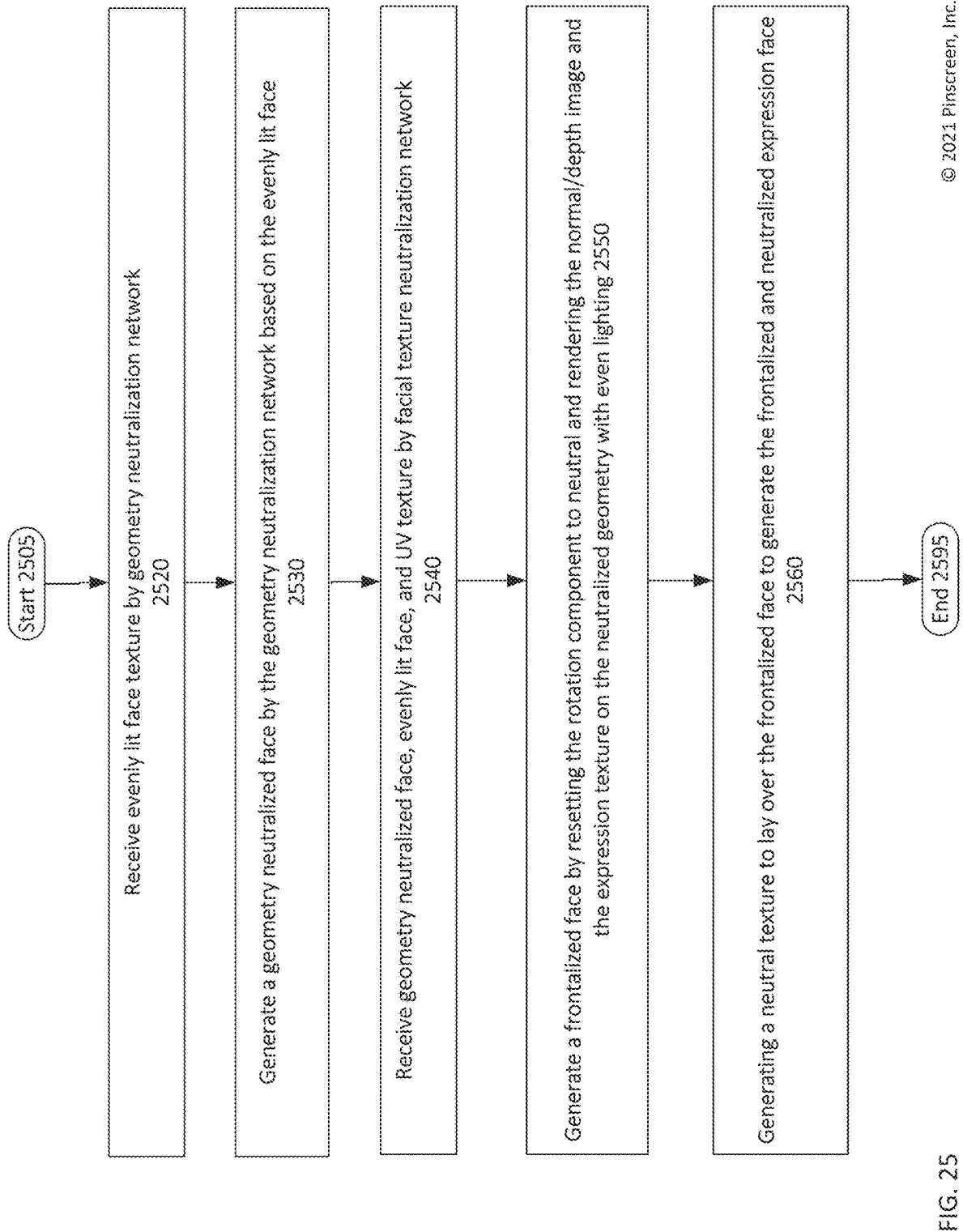
FIG. 25 is a flowchart of a process for generating a frontalized and neutralized expression face based on an evenly lit face.

The process of FIG. 25 begins at start 2505 and continues until end 2595. At step 2520, the geometry neutralization network receives the evenly lit face. At step 2530, the geometry neutralization network generates a geometry neutralized face based on the evenly lit face. At step 2540, the facial texture neutralization network receives the geometry neutralized face, the evenly lit face, and UV texture from the three-dimensional face fitting. At step 2550, using the neutralized geometry inferred from the geometry neutralization network, the masked expression image, and the UV expression texture from the light normalization network, a frontalized face is generated by resetting the rotation component to neutral and rendering the normal/depth image and the expression texture on the neutralized geometry with even lighting to create an image with an evenlylit and modeled face. At step 2560, the facial texture neutralization network generates a neutral texture for the face to apply to the frontalized face with normalized geometry from step 2550 to generate the frontalized and neutralized expression face.

The process then ends at 2295.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A deep learning-based framework system for generating a normalization of a single two-dimensional image of an unconstrained human face, the system comprising a processor and memory, the processor executing instructions which cause the processor to:
   receive the single two-dimensional image of the unconstrained human face;
   use a perspective undistortion network to remove perspective distortion from the unconstrained human face to generate an undistorted face based on the unconstrained human face, wherein removing perspective distortion includes performing three-dimensional face fitting to the undistorted face to obtain a fitted three-dimensional mesh, spherical harmonics shading coefficients, and UV texture;
   use a lighting translation network to generate an evenly lit face based on the undistorted face by normalizing lighting of the undistorted face; and
   use an expression neutralization network to generate a frontalized and neutralized expression face based on the evenly lit face.

2. The system of claim 1, wherein the perspective undistortion network:

predicts a dense two-dimensional flow based on the image and two-dimensional landmarks detected in the image to generate the undistorted face.

3. The system of claim 1, wherein the lighting translation network uses the spherical harmonics shading coefficients to generate the evenly lit face.

4. The system of claim 1, wherein the expression neutralization network uses the UV texture to generate the frontalized and neutralized expression face.

5. The system of claim 1, wherein the expression neutralization network generates a frontalized and neutralized face by: using a geometry neutralization network to neutralize geometry of the evenly lit face to generate a geometry neutralized face; and using a facial texture neutralization network to neutralize facial texture of the geometry neutralized face to generate the frontalized and neutralized expression face.

6. The system of claim 1, wherein the perspective undistortion network is a generative adversarial network trained via dense flow fields by fitting three-dimensional face models to input images with known focal length and camera-to-subject distance; wherein the lighting translation network is a conditional generative adversarial network trained via synthetic illumination data based on portrait relighting; and wherein the expression neutralization network is a generative adversarial network trained based on expression-to-neutral and neutral-to-expression datasets.

7. A method of generating a normalization of a single two-dimensional image of an unconstrained human face comprising:
receiving the single two-dimensional image of the unconstrained human face;
using a perspective undistortion network to remove perspective distortion from the unconstrained human face to generate an undistorted face based on the unconstrained human face, wherein removing perspective distortion includes performing three-dimensional face fitting to the undistorted face to obtain a fitted three-dimensional mesh, spherical harmonics shading coefficients, and UV texture;
using a lighting translation network to generate an evenly lit face based on the undistorted face by normalizing lighting of the undistorted face; and
using an expression neutralization network to generate a frontalized and neutralized expression face based on the evenly lit face.

8. The method of claim 7, wherein the perspective undistortion network:
predicts a dense two-dimensional flow based on the image and two-dimensional landmarks detected in the image to generate the undistorted face.

9. The method of claim 7, wherein the lighting translation network uses the spherical harmonics to generate the evenly lit face.

10. The method of claim 7, wherein the expression neutralization network uses the UV texture to generate the frontalized and neutralized expression face.

11. The method of claim 7, wherein the expression neutralization network generates a frontalized and neutralized face by: using a geometry neutralization network to neutralize geometry of the evenly lit face to generate a geometry neutralized face; and using a facial texture neutralization network to neutralize facial texture of the geometry neutralized face to generate the frontalized and neutralized face.

12. The method of claim 7, wherein the perspective undistortion network is a generative adversarial network trained via dense flow fields by fitting three-dimensional face models to input images with known focal length and camera-to-subject distance; wherein the lighting translation network is a conditional generative adversarial network trained via synthetic illumination data based on portrait relighting; and wherein the expression neutralization network is a generative adversarial network trained based on expression-to-neutral and neutral-to-expression datasets.

13. An apparatus comprising a storage medium storing a program having instructions which when executed by a processor will cause the processor to:
receive the single two-dimensional image of an unconstrained human face;
use a perspective undistortion network to remove perspective distortion from the unconstrained human face to generate an undistorted face based on the unconstrained human face, wherein removing perspective distortion includes performing three-dimensional face fitting to the undistorted face to obtain a fitted three-dimensional mesh, spherical harmonics shading coefficients, and UV texture;
use a lighting translation network to generate an evenly lit face based on the undistorted face by normalizing lighting of the undistorted face; and
use an expression neutralization network to generate a frontalized and neutralized expression face based on the evenly lit face.

14. The apparatus of claim 13, wherein the perspective undistortion network:
predicts a dense two-dimensional flow based on the image and two-dimensional landmarks detected in the image to generate the undistorted face.

15. The apparatus of claim 13, wherein the lighting translation network uses the spherical harmonics shading coefficients to generate the evenly lit face.

16. The apparatus of claim 13, wherein the expression neutralization network generates a frontalized and neutralized face by: using a geometry neutralization network to neutralize geometry of the evenly lit face to generate a geometry neutralized face; and using a facial texture neutralization network to neutralize facial texture of the geometry neutralized face to generate the frontalized and neutralized face.

17. The apparatus of claim 13, wherein the perspective undistortion network is a generative adversarial network trained via dense flow fields by fitting three-dimensional face models to input images with known focal length and camera-to-subject distance; wherein the lighting translation network is a conditional generative adversarial network trained via synthetic illumination data based on portrait relighting; and wherein the expression neutralization network is a generative adversarial network trained based on expression-to-neutral and neutral-to-expression datasets.

* * * * *